US011601339B2

(12) United States Patent
Janakiraman

(10) Patent No.: US 11,601,339 B2
(45) Date of Patent: Mar. 7, 2023

(54) METHODS AND SYSTEMS FOR CREATING MULTI-DIMENSIONAL BASELINES FROM NETWORK CONVERSATIONS USING SEQUENCE PREDICTION MODELS

(71) Applicant: HEWLETT PACKARD ENTERPRISE DEVELOPMENT LP, Houston, TX (US)

(72) Inventor: Ramsundar Janakiraman, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 646 days.

(21) Appl. No.: 16/563,669

(22) Filed: Sep. 6, 2019

(65) Prior Publication Data

US 2021/0075690 A1 Mar. 11, 2021

(51) Int. Cl.
*H04L 41/147* (2022.01)
*G06F 40/279* (2020.01)
(Continued)

(52) U.S. Cl.
CPC .......... *H04L 41/147* (2013.01); *G06F 40/205* (2020.01); *G06F 40/279* (2020.01); *H04L 63/1425* (2013.01); *H04L 63/20* (2013.01)

(58) Field of Classification Search
CPC ... H04L 41/147; H04L 63/1425; H04L 63/20; G06F 40/279; G06F 40/205
(Continued)

(56) References Cited

U.S. PATENT DOCUMENTS 7,231,393 B1 6/2007 Harik et al.
8,117,486 B2 2/2012 Handley et al.
(Continued)

FOREIGN PATENT DOCUMENTS

WO WO-2014209566 12/2014
WO WO-2017083191 5/2017

OTHER PUBLICATIONS

Zhu et al., "Exploring Semantic Properties of Sentence Embeddings", Jul. 2018 (Year: 2018).*
(Continued)

*Primary Examiner* — Thanh T Le
(74) *Attorney, Agent, or Firm* — Sheppard Mullin Richter & Hampton LLP

(57) ABSTRACT

Systems and methods are provided for utilizing natural language process (NLP), namely sequence prediction approaches, in the realm of network security. Techniques include analyzing network transaction records to form network sentences representative of network activity. The network sentences are formulated by regularizing transactions records using words, allowing the network sentences to represent the network activity using natural language terminology. In some cases, multiple variations of the network sentences having different sequences of words are generated to form a corpus of network sentences related to a semantics of network activity. Accordingly, an NLP-based network prediction model can be created and trained using the corpus of network sentences. The network prediction model can be trained over to identify dimensions corresponding to particular sequences of words in the network sentences, and predict an expected dimension. Using the network prediction model predictions of expected network are provided, and anomalies efficiently detected.

17 Claims, 11 Drawing Sheets

(51) Int. Cl.
  *G06F 40/205* (2020.01)
  *H04L 9/40* (2022.01)
(58) Field of Classification Search
  USPC .......................................................... 726/22
  See application file for complete search history.

(56) References Cited

U.S. PATENT DOCUMENTS

| | | | |
|---|---|---|---|
| 10,305,758 B1 | 5/2019 | Bhide et al. | |
| 10,354,201 B1 | 7/2019 | Roy et al. | |
| 10,803,050 B1 | 10/2020 | Salkola | |
| 11,218,498 B2* | 1/2022 | Hajimirsadeghi | H04L 63/1425 |
| 2005/0120105 A1 | 6/2005 | Popescu et al. | |
| 2010/0031156 A1 | 2/2010 | Doyle et al. | |
| 2012/0151561 A1 | 6/2012 | Kreiner et al. | |
| 2013/0262645 A1 | 10/2013 | Akchurin et al. | |
| 2016/0057020 A1 | 2/2016 | Halmstad et al. | |
| 2016/0374107 A1 | 12/2016 | Das et al. | |
| 2017/0004208 A1 | 1/2017 | Rodder et al. | |
| 2017/0017635 A1 | 1/2017 | Leliwa et al. | |
| 2017/0091168 A1 | 3/2017 | Bellegarda et al. | |
| 2017/0262523 A1 | 9/2017 | Epstein et al. | |
| 2017/0279829 A1 | 9/2017 | Vasseur et al. | |
| 2017/0366607 A1 | 12/2017 | Juhlin et al. | |
| 2018/0004948 A1 | 1/2018 | Martin et al. | |
| 2018/0219895 A1* | 8/2018 | Silver | H04L 43/062 |
| 2018/0248902 A1* | 8/2018 | Dãnilã-Dumitrescu | G06N 3/02 |
| 2018/0307678 A1* | 10/2018 | Anantaram | G10L 15/22 |
| 2019/0180141 A1 | 6/2019 | Tiagi et al. | |
| 2019/0273510 A1 | 9/2019 | Elkind et al. | |
| 2019/0370347 A1 | 12/2019 | Levy et al. | |
| 2020/0076841 A1* | 3/2020 | Hajimirsadeghi | G06N 3/0454 |
| 2020/0293657 A1* | 9/2020 | Chai | G06F 21/554 |
| 2021/0383459 A1* | 12/2021 | Myara | H04L 63/1425 |

OTHER PUBLICATIONS

Bhandari, S. et al., Cloud-Assisted Device Clustering for Lifetime Prolongation in Wireless IoT Networks, (Research Paper), Apr. 2017, 5 pgs.

Chen, J. et al., Semantic Information Extraction for Improved Word Embeddings, (Research Paper), Proceedings of NAACL-HLT 2015, May 31-Jun. 5, 2015, pp. 168-175.

Chung, S. et al., An Unobtrusive Interaction Interface for Multiple Co-located Mobile Devices, (Research Paper), 2015 IEEE 11th International Conference on Wireless and Mobile Computing, Networking and Communications (WiMob), Dec. 7, 2015, 3 pgs.

Ghosh, S. et al., Neural Networks for Text Correction and Completion in Keyboard Decoding, Journal of Latex Class Files, Aug. 2015, vol. 14, No. 8, pp. 1-14.

Lamba, H. et al., A Model-based Approach to Anomaly Detection in Software Architectures, (Research Paper), 2016, 10 pgs., HotSoS, Pittsburgh, PA, USA.

Lopez, W. et al., Vector Representation of Internet Domain Names using a Word Embedding Technique, (Research Paper), 2017, 8 pgs., IEEE.

Ramachandran, A. et al., Monitoring Stealthy Network Conversations with Sampled Traffic, (Research Paper), Dec. 2006, 54 pgs.

Rothe, S. et al., AutoExtend: Combining Word Embeddings with Semantic Resources, Computational Linguistics, Mar. 13, 2017, 25 pgs., vol. 43 No. 3, Association for Computationa Linauistics.

Anonymous Authors, Time-Dependent Representation for Neural Event Sequence Prediction, (Research Paper), 2018, 11 pgs.

Ververidis, C. et al., Service Discovery for Mobile Ad Hoc Networks: A Survey of Issues and Techniques, (Research Paper), Retrieved Nov. 16, 2018, 18 pgs.

Vijayalakshmi, S. et al., Mining of Users' Access Behaviour for Frequent Sequential Pattern from Web Logs, (Research Paper), International Journal of Database Management Systems (IJDMS), Aug. 2010, 15 pgs., vol. 2, No. 3.

Butterworth et al., "Device Discovery with mDNS and DNS-SD", Apple Inc., Oct. 5, 2009, 16 pages.

DNS SRV (RFC 2782) Service Types, available online at <http://www.dns-sd.org/servicetypes.html>, 2003 to 2010, 36 pages.

Genism, "Top Modelling for Humans", available online at <https://web.archive.org/web/20190705220216/https://radimrehurek.com/gensim/>, Jul. 5, 2019, 2 pages.

Mikolov et al., "Distributed Representations of Words and Phrases and their Compositionality", Oct. 16, 2013, pp. 1-9.

Pennington et al., "GloVe: Global Vectors for Word Representation", Oct. 2014, 12 pages.

Mikolov et al., "Efficient Estimation of Word Representations in Vector Space", Sep. 7, 2013, pp. 1-12.

\* cited by examiner

| File | Edit | Format | View | Help | | | | January 14, 2018 |
|---|---|---|---|---|---|---|---|---|

300

| ServerName | DatabaseName | LogsGenerated | DurationInSeconds | Usernames | TimeStamp |
|---|---|---|---|---|---|
| 350 | 351 | 352 | 353 | 354 | 355 |
| ex-08-07 | ex-08-db151 | 135 | 277213 | UserA | 09:01:23 |
| ex-03-05 | ex-03-db039 | 115 | 86394 | UserB | 09:01:44 |
| ex-08-11 | ex-08-db240 | 2068 | 172839 | UserA | 09:01:49 |
| ex-02-09 | ex-02-db127 | 118 | 86405 | UserD | 09:01:52 |
| ex-04-10 | ex-04-db223 | 26 | 86405 | UserC | 09:01:52 |
| ex-05-03 | ex-05-db242 | 845 | 68407 | UserD | 09:02:06 |
| ex-09-05 | ex-09-db251 | 4705 | 316826 | UserA | 09:02:07 |
| ex-01-07 | ex-01-db021 | 227 | 190798 | UserA | 09:02:09 |
| ex-08-07 | ex-08-db061 | 582 | 82792 | UserB | 09:02:30 |
| ex-01-09 | ex-01-db217 | 4635 | 410411 | UserC | 09:02:38 |
| ex-03-02 | ex-03-db242 | 4717 | 597654 | UserC | 09:02:54 |
| ex-08-11 | ex-08-db178 | 1885 | 172807 | UserC | 09:03:23 |
| ex-08-07 | ex-08-db106 | 10134 | 597604 | UserD | 09:06:13 |

FIG. 3A

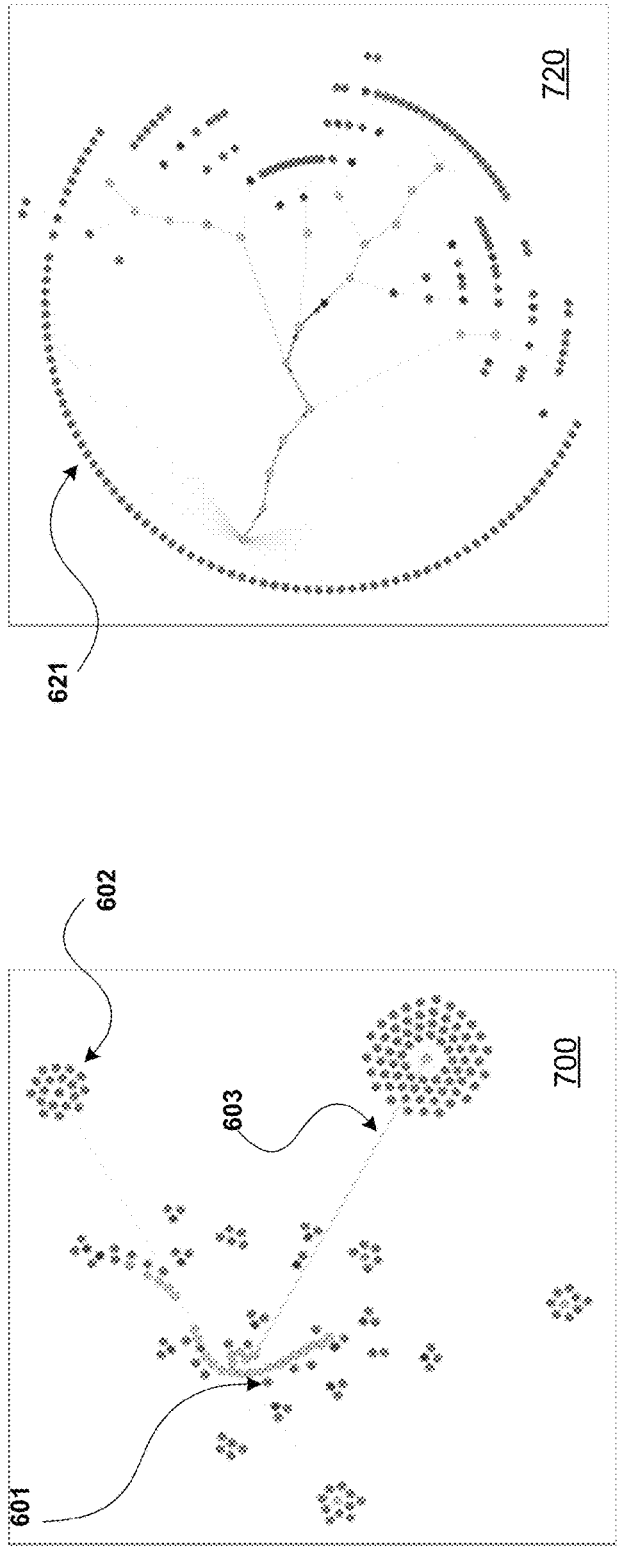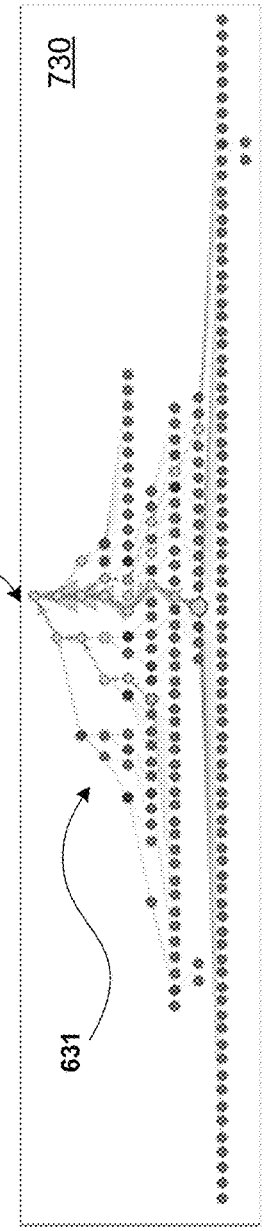
FIG. 7A
FIG. 7B
FIG. 7C

METHODS AND SYSTEMS FOR CREATING MULTI-DIMENSIONAL BASELINES FROM NETWORK CONVERSATIONS USING SEQUENCE PREDICTION MODELS

CROSS REFERENCE TO RELATED APPLICATIONS

This application is related to co-pending and co-owned U.S. patent application Ser. No. 16/374,728 filed on Apr. 3, 2019, entitled "METHODS AND SYSTEMS FOR DEVICE GROUPING WITH INTERACTIVE CLUSTERING USING HIERARCHICAL DISTANCE ACROSS PROTOCOLS", which is hereby incorporated by reference herein in its entirety and co-pending and co-owned U.S. patent application Ser. No. 16/513,522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is hereby incorporated by reference herein in its entirety.

DESCRIPTION OF RELATED ART

In the realm of network security, it may be beneficial for security analytics products to increase the accuracy in the results they provide, as a way of gaining customer trust and raising confidence in use of the products themselves. As an example, there may be significant value in the area of network security for software that includes the capability to differentiate outliers that may be captured (but do not verifiably indicate a security threat) from the valid detected anomalies within the network, in a robust manner. Furthermore, with various advancements in Natural Language Processing (NLP), for example pertaining to semantic learning and auto-encoding, it may be possible to leverage text-based analysis (e.g., learning semantics) in a manner that requires limited human interaction and further may be applied to highly automated processes, such as network monitoring.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3A illustrates an example of a network transactions log including records relating to network activity in the communications network shown in FIG. 1, according to some embodiments.

FIGS. 7A-7C depict examples of network graphs generated using visualization aspects of the network analytics system disclosed herein, according to some embodiments.

Figure 1:
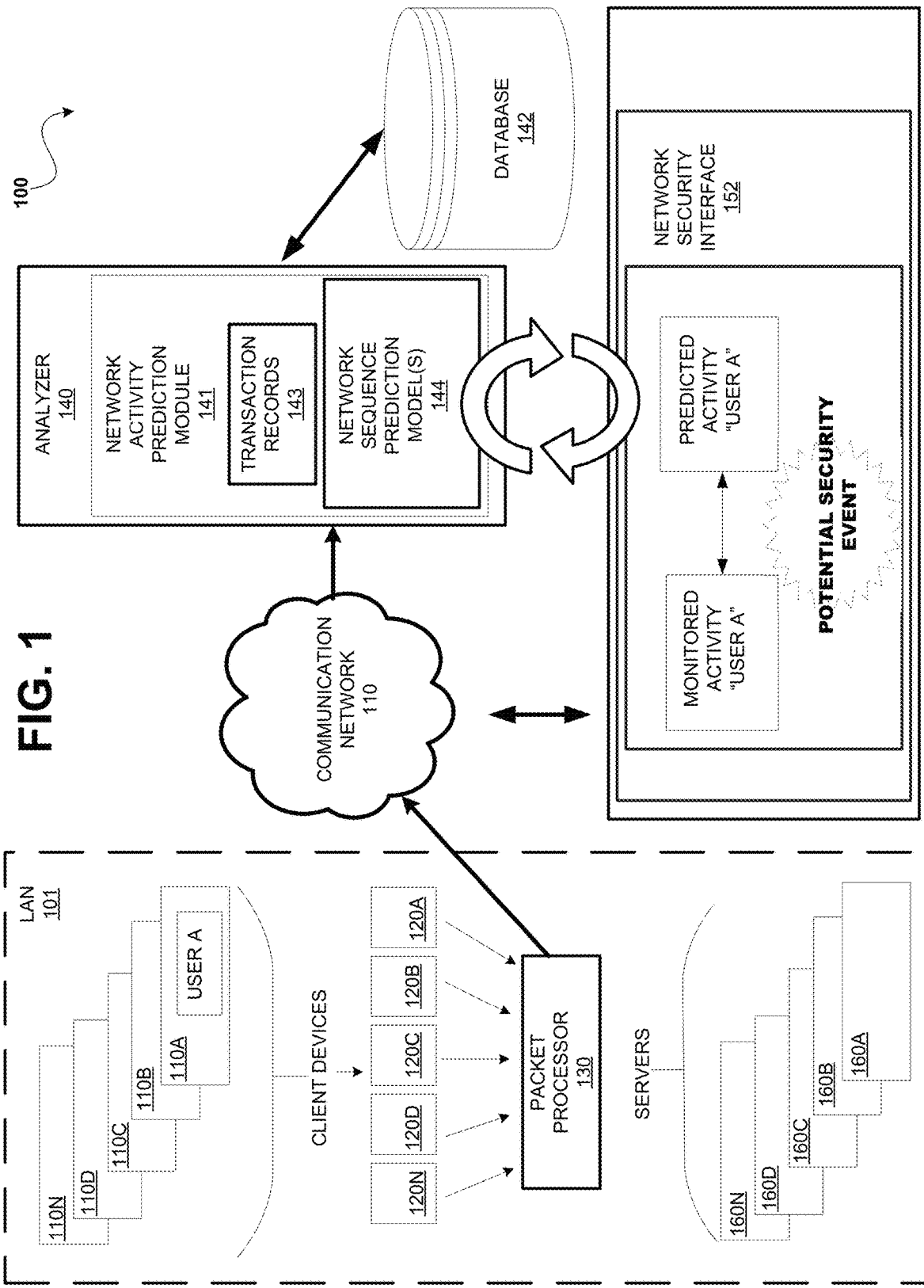
FIG. 1 illustrates an example of a system distributed across a communications network and including a network device implementing techniques for analyzing network activity using network sequence prediction (NSP) models, according to some embodiments.

The figures are not exhaustive and do not limit the present disclosure to the precise form disclosed.

DETAILED DESCRIPTION

Various embodiments described herein are directed to techniques and systems for using sequence prediction, which is a concept in Natural Language Processing (NLP), particularly in the realm of communication network security and/or network analytics. In some instances, sequence prediction can be used to complete missing dimensions given associated dimension(s), where the dimensions can be characteristics representing the various interactions within a communications network, for instance time of the interaction and a particular user associated with the interaction. For example, practically applying sequence prediction can be used to predict a missing dimension from the given dimensions, such as a time source, user and destination—volume of data or source, destination, user and volume, time during the day (e.g., wherein time encoded in human terms like morning, mid-day and early morning helps regularize the model by humanizing terms that incorporates worldly context into values).

In another application of sequence prediction, the disclosed techniques can be used to predict a sequence of servers. In these applications, sequence prediction can be leveraged to cure the servers to enterprise assets derived using information from discovery protocols (Internal domain keywork from search domains in DHCP). The strength of server sequence predication can go back to the embeddings built cohesively and cured by an administrator, for example, to filter out data collection and any prior abnormal accesses (that may otherwise flagged as anomalies).

Referring back to general network analytics applications, some existing network monitoring systems have the capability to collect vast amounts of data from network traffic, such as interactions amongst entities within an enterprise network. Nonetheless, gaining valuable insight from such data for purposes of network security and/or analytics, such as recognizing access trends can present numerous challenges. Due to privacy concerns (e.g., personal identification information) and high data volume, data is often times unlabeled. As a result, data collected from the network may be disassociated from user identifiers, and other types of information that may provide valuable context with respect to security. Even further, separate networks can have distinct layouts, architectures, and operations that are specific to the respective network. These disparities between networks can grow even farther when observed across a large population (e.g., global business), which does not lend itself to a universal analysis approach that can easily and effectively transfer across a plurality of networks (e.g., in terms of customer to customer, and also in terms of the deep learning transfer learning).

Advantageously, the disclosed embodiments can leverage NLP to represent network interactions as semantical structures (e.g., characters, words, sentences), with the network protocol being analogous to a spoken language defining the semantics. For example, the disclosed techniques can represent transaction records (related to an interaction between network entities) as vectors in a dimensional space as applied to natural language sentences, using embedding models. As such, NLP techniques can be further applied to the analyze interactions, as indicated by the transaction records, as text and other natural language structures (e.g., words, sentences, etc.). Thus, the NLP-driven techniques disclosed herein, allows network interactions to be analyzed in manner similar to analyzing contextual relationships between words in a sentence based on the semantics. The embedding techniques disclosed herein can ultimately capture network behavior, recognizing similarities and occurrences between interactions weeded out by the admin using visualizations conducive to represent embeddings and thereby adding contextual worth to data that may otherwise be less meaningful in convention network security techniques.

Furthermore, by representing network interactions as semantical structures, the concept of sequence prediction, which is typically limited to text-based analysis, can be used as a prediction tool in the network security realm, as well. The disclosed sequence prediction techniques can generate a sequence prediction model from the observed trends in network behavior derived from compiled "sentences" of network interactions.

As discussed herein, NLP can be generally described as multiple theory-driven computational techniques for the automatic analysis and representation of human language. NLP, referred to herein, may be processes that involve computers performing a wide range of natural language related tasks at various levels, such as parsing, and pattern recognition. Recent advancement in deep learning, for instance applying neural networks for dense vector representations, has further improved some NLP-based tasks. Closely related to this trend of deep learning within NLP is the concept of word embeddings.

Generally, word embedding techniques have been employed to understand word relationships in a document or "corpus." As referred to herein, corpus can be defined as a body of words within a text or collection of texts. Accordingly, an advantage of embedding (e.g., distributional vectors) is its ability to capture similarity between words. Furthermore, measuring similarity between vectors is possible. Embeddings, due to these characteristics, can be useful as a processing layer in a deep learning model. Further details regarding word embeddings and other semantic learning approaches are described in U.S. patent application Ser. No. 16/513,522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is hereby incorporated by reference herein in its entirety.

An extension of word embeddings is the concept of sequence prediction. Sequence prediction models have been used to implement text prediction capabilities in various applications, such as chat apps, and auto-completion (e.g., search engines), for example. As a general description, NLP-driven sequence prediction involves compiling a collection of sentences, or series of words, over time and presenting them to a prediction model. The prediction model's task is to then, based on analysis of the previously analyzed sentences, to present the word (or words) with the highest probability of following a series of words to the user. In many cases, NLP-driven sequence prediction uses a "corpus" and an semantic learning technique, such as word embeddings, as the building blocks to train the sequence prediction model.

Figure 2:
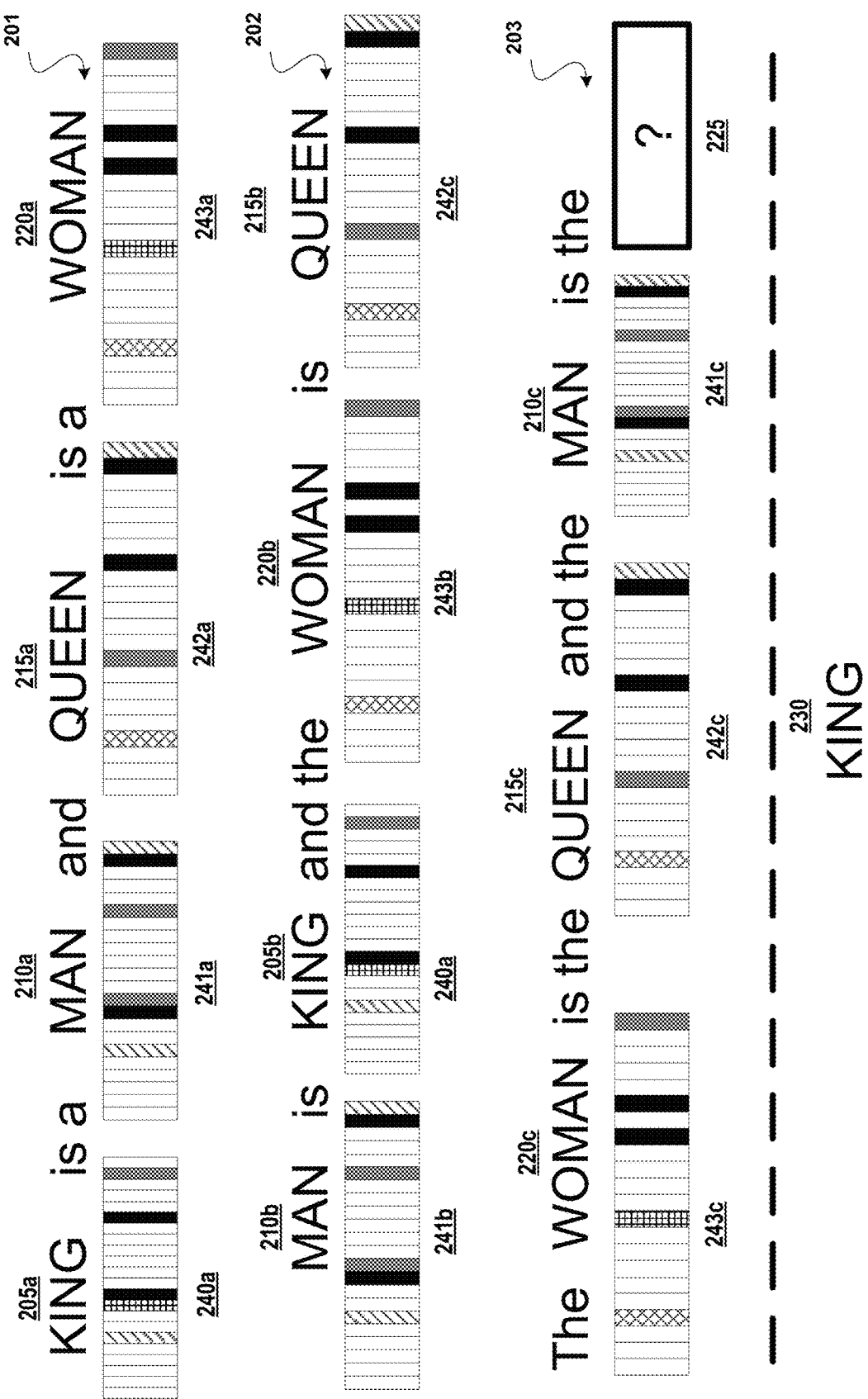
FIG. 2 is a conceptual diagram of an example of NLP-driven sequence predictions, according to some embodiments.

A conceptual example of NLP-driven sequence prediction is illustrated in FIG. 2. In the illustrated example, multiple sentences 201 and 202 in a natural language may be received by a sequence prediction model. A first sentence 201 is shown as "King is a man and queen is a woman." Another sentence, sentence 202 is shown to read, "The man is king and the woman is queen." Notably, sentence 202 can be considered as a rephrasing of the first sentence 201. In other words, sentence 202 primarily includes many of the same words used in sentence 201, but arranged in a different sequence. In an example, a first sentence can read "In the morning John visited his bank portal." An example of that sentence rephrased, having the same words arranged in a different sequence, may be "Bank portal was visited by John in the morning."

As seen in FIG. 2, word embeddings can be formulated from various words in each of the sentences 201 and 202. Particularly, the words "King" 205a, "Man" 210a, "Queen" 215a, and "Woman" 220a, from sentence 201 are represented as embeddings. Also, the words "King" 205b, "Man" 210b, "Queen" 215b, and "Woman" 220b, from sentence 202 are represented as embeddings. Often times, word embeddings can be derived from observing words that are grouped together, such as in sentences 201 and 202. Referring to the example of sentence 201, the words "King" 205a, "Man" 210a, "Queen" 215a, and "Woman" 220a occur together (within respect to a sentence) in a sequence, which can be considered a contextual relationship. Thus, based on NLP-driven analysis, the sequence prediction model can be trained to learn that the words "King" 205a "Man" 210a, "Queen" 215a, and "Woman" 220a have some level of contextual relationship due to natural language semantics and syntax. By employing word embedding techniques, each word can have its own corresponding vector representation, shown in FIG. 2 as: "King" 205a being represented as vector 240a; "Man" 210a being represented as vector 241a; "Queen" 215a being represented as vector 242a; and "Woman" 220a being represented as vector 243a. Thus, these vectors 240a, 241a, 242a, 243a in embeddings can capture contextual characteristics of the neighboring words. For instance, similarities between the vectors 240a, 241a, 242a, 243a can be measured, capturing a contextual relationship between the words. As an example in the natural language context, it can be ascertained that a "King" 205a is also a "Man" 210a based on English definitions, thus the words have some similarity. Also, a contextual relationship between the words "Queen" 215a and "Woman" 220a may be derived.

Similarly, the abovementioned words appear together in sentence 202, but arranged in another sequential order, namely "Man" 210b, "King" 205b, "Woman" 220b, and "Queen" 215b. Furthermore, embeddings for each of these words can be determined, as previously described. FIG. 2 illustrates each of the words in sentence 202 also correspond to a vector representation, shown as: "King" 205b being represented as vector 240b; "Man" 210b being represented as vector 241b; "Queen" 215b being represented as vector 242b; and "Woman" 220b being represented as vector 243b. Accordingly, an NLP-driven sequence prediction model can analyze a frequency of occurrence related to sequences of certain words (based upon their contextual relationships), by being trained on sentences 201 and 202 (and additional sequences including these words, occurring in a number of sentences observed over a period of time). For instance, a sequence prediction model may be trained to derive that in many instances, the words Man" 210a,b "King" 205a,b "Woman" 220b, and Queen" 215a,b appear in the same sentence. Thus, the sequence prediction model can use word embeddings analyzed during its training, in order to predict an "expected" word in the sequence, based on context.

Referring again to the example in FIG. 2, after being trained on sentences 201 and 202, the sequence prediction model can then encounter a partial sequence, illustrated as an incomplete sentence 203. As an example, a partial sequence, for instance incomplete sentence 203, can be initial words that are analyzed for a sequence prediction application, such as entering the incomplete sentence 203 into a search bar of web application for auto-completion. In the example, incomplete sentence 203 has some of the same words as sentences 201 and 202, which were previously analyzed by the sequence prediction model (during training). Sentence 203 reads "The woman is the queen and the man is the . . . " In this example, the partial sequence in sentence 203 includes "Woman" 220c, "Queen" 215c, and "Man" 210c, which were also observed in sentences 201 and 202. Also, as illustrated, sentence 203 may include at least one additional and unknown word 225 (represented by a box having a question mark, indicating a subsequent unknown word or group of words), for instance the next word(s) that a user intends to type into the search bar following entering the words 220c, 215c, and 210c, in the partial sequence. In some instances, the prediction model may generate word embeddings for the words of the partial sequence for the text analysis needed to detect a known sequence of words, and subsequently predict an "expected" word to complete the sequence. In the illustrated example, words embeddings related to incomplete sentence 203 include: "Woman" 220c being represented as vector 243c; "Queen" 215c being represented as vector 242c; and "Man" 210c being represented as vector 241c. the Using NLP-driven sequence prediction techniques, the sequence prediction model can analyze the particular sequence of the words that is present in sentence 203 (and the its corresponding word embeddings), which can be used to make a prediction on a word that is expected, or has a high likelihood, of following the words in the sequence, based on context. This concept is also illustrated in FIG. 2. As alluded to above, contextual relationships derived from semantic information given by vectors in sentence 201 and 202 are learned by the prediction model in manner that allows a prediction to be generated. The sequence prediction can be a word that may occur in a similar context of the previously observed sentences, for instance and having a similar meaning to the word "Man" 210c based on the particular context, may be generated. In FIG. 2, the sequence prediction model predicts "King" 230 as the expected" word, in response to the learned contextual relationship between the same words "Woman" 220c, "Queen" 215c, and "Man" 210c and "King" 230, as seen in previous sequences (e.g., from sentences 201 and 202).

As described herein, word embeddings can be described as a vector representation (e.g., vector of numbers) of a document vocabulary which is capable of capturing the context of the words in a document. Transaction records are data structures that include data related to interactions between entities within a network (e.g., Netflow records or Flow records with deep packet inspection information). For instance, text of a transaction record can be parsed to extract information linked to an interaction, such as which server within an enterprise is accessed by a particular user, by correlating with Active Directory or other Authorization logs, during a network communication. These transaction records can be subjected to text-based analysis, where the data included in each transaction record can be viewed as natural language words. Similarly, transaction records can be equivalent to sentences (referred to as network activity sentences). Thus, collecting a vast collection of data from multiple transactions over a period of time can build a "corpus" of the network activity which drives formulation of the embedding space. It should be appreciated that although network embedding techniques are described with respect to transaction records for purposes of illustration, that the disclosed techniques are not limited to transaction records and can be applied to various other types of structures that contain relevant information usable to formulate the corpus, such as firewall logs.

For example, in the realm of computer networking, one way of formulating a "sentence" is use of network interaction. In this sense, a "sentence" can be considered a network interaction that is captured for analysis by their corresponding transaction records. A key concept here involves formulating a list of assets that pertains to the network with respect to the importance of content hosted by that asset. A "sentence" of servers, for instance, can include several servers in related interactions that may be grouped together, for instance by the users accessing them. As such, NLP is leveraged to implement the disclosed network sequence prediction (NSP) techniques, which are applied to "sentences" of network interactions in a manner that is similar to applying NLP-driven sequence prediction techniques to natural language sentences (as described in detail in reference to FIG. 2).

In addition, the data from network interactions goes through a preparation process as these network sentences are formulated. Through data preparation (e.g., filtering, regularization, etc.) much of the data that is unusable as its pertaining to human interpretation and NLP analysis (e.g., garbage data) is removed, thereby improving the intelligibility and recognizability (e.g., structured similar to natural sentences) of network sentences. As an example, when a user employs a network device, a sequence of access can include work related accesses, and other partial or non-work related resources that are not owned by the enterprise (e.g., cloud or in the server closet) through general browsing that are reflection of personal habits like reading news, social media interactions, and following blogs. Network sentences representing these interactions of the user would include all of these resources, both internal and external to the enterprise. The network sentences, in the realm of NLP, are analogous to multiple textual sentences that are correlated into one sentence. Consequently, without proper separation of the data during formulating these network sentences, the approach of sequence prediction is tantamount to garbage in and garbage out. Hence the prior steps of data preparation and cleanup improves the quality of the network sentences that are formulated, thereby forming the strength of the approach that is centered around analysis of network sentences.

However, in a broader sense, network "sentences" can be used in various other NLP-driven techniques for network analytics. For instance, formulating network sentences can be further used for building sentence embeddings and comparing semantics of sentences to assess equivalence of sequences of access. Similarly, formulating network sentences can be used to predict, and also compare, semantics based on the use-case which will dictate the formulation of corpus. Furthermore, the concept of formulating corpuses can be extended for other network analysis applications, including: data preparation—involving using graphing techniques using HTTP referrer to formulate sequences, thereby formulating sentences; and embeddings—involving generating embeddings for several different entities using the same (or similar) corpus that is same (or a superset) of a network vocabulary. It should be understood that the "sentence" of servers, as discussed above, exemplifies one use-case for purposes of illustration, and other examples of network sentences and related use-cases are described in further detail. Also, it should be appreciated that the described network sentences and corresponding use-cases are not intended to be limiting, and similar techniques can be applied for other use-cases that are not discussed in detail herein.

Moreover, the sequence prediction techniques can be used enhance network analytics and/or network security capabilities. According to the embodiments, an NSP model can be trained over time, given prior sequences of interactions that relate to a specific network entity, such as a sequence of servers that are accessed by a particular user (e.g., as observed from collected transaction records). As a result, the NSP model has the capability to predict an "expected" next access for that same user, based on the access behavior for that user which has been learned by the NSP model. With respect to network security, an application of the disclosed NSP techniques can involve monitoring a user, and comparing a sequence of servers that are accessed in network from monitoring the user's behavior, against one or more "expected" next server accesses (resulting from analyzing the user's network activity over time using NSP techniques). For instance, a deviation from a monitored server access and an "expected" server access predicted by the NSP model may indicate a violation of expected network behavior (e.g., network administrators determine rules or behavior observations).

Referring now to FIG. 1, an example of a system 100 distributed across a communications network 110 and including a network device, shown as analyzer 140 for implementing the disclosed NSP techniques is illustrated. The analyzer 140 can be configured for implementing various NLP-driven techniques (e.g., semantic learning, word embeddings, sequence prediction, etc.) for enhanced network analytics, according to some embodiments. In some embodiments, the analyzer 140 can be a centralized computer, such as a server, having a processing capacity that is suitable to support the data processing and analysis necessary to implement the NSP features disclosed herein. Details describing the function and capabilities of the analyzer 140 are further described throughout. Although the illustrated example shows the NLP-based analysis being performed centrally at the analyzer 140, some machine learning techniques allow for a more distributed training and inference. For example, in an example, training can be performed at the backend (e.g., centralized server, or in the cloud) and the inference performed at the client devices. In another example, inference can be accomplished via the backend (e.g., in the cloud) with the results shown at the client device(s). Typically, due to the amount of compute involved for inferences, both training and inference (e.g., predictions/ recommendations) aspects are both done in the cloud where devices having greater processing capacity and/or resources, such as servers, are deployed. However, now with the inclusion of hardware and CPU additional instruction sets, devices at the edge, such as mobile devices with limited capacity, can be enabled to perform inference. Accordingly, in some embodiments, the disclosed NLP-based prediction techniques can done at the edge, for example clients devices 110A-110N.

In FIG. 1, an example network architecture includes clients devices 110A-110N, servers 160A-160N, and packet processor 130 that can be proximately located, for instance within the same customer premises. Additionally, the client devices 110A-110N, servers 160A-160N, and the packet processor 130 can be communicatively connected to each other as part of a local area network (LAN) 101 (indicated by dashed lines). LAN 101 may be installed at the customer premises, such as in retail a store, a business (e.g., restaurants, shopping malls, and the like), a factory, an office building, and the like. In that regard, LAN 101 may include one or more of the clients devices 110A-110N.

Client devices 110A-110N may include a desktop, a laptop, or a mobile device such as a smart phone, a tablet, or any other portable computing device capable to communicate through LAN 101. In that regard, for example, client device 110A may include several types of devices, which, even in the case that client device 110A is mobile, may be loosely or less often associated or co-located with a user. Another type of client device 110B, for instance, may be more often or almost always associated or co-located with a user (e.g., a smart phone or another wearable device). As illustrated, the plurality of client devices 110A-110N can attempt to communicate with, or otherwise access the servers 160A-160N on LAN 101. In the illustrated example, servers 160A-160N include hardware and software to provide data and/or services for consumption by client devices 110A-110N. For example, a server 160A can include a web-based application that handles and delivers e-mail over a network, typically over the Internet. Thus, certain client devices, for instance client device 110A, may be used by an employee that connects to server 160A for communicating via e-mail. Another server, such as server 160B, can act as a finance server for a business, and thus can provide certain financial applications (e.g., sales portals) and financial documents. In some cases, access to a finance server 160B may be limited to certain client devices on the LAN 101, for example devices that belong to those employees in the financial department. An employee within the financial department may have permission to financial aspects of the business, such as accounting personnel. Accordingly, a client device 110B, used by an accountant, may access server 160B in order to perform financially based tasks. Alternatively, client device 110A may not have a need for (or may be restricted from having authorization) accessing server 160B.

Continuing with the example, another server on LAN 101, such as server 160C, can provide another distinct service. Server 160C, for instance, can be a code repository server that supports multi-developer projects by hosting source code (e.g., allowing developers to submit and/or access patches of code). As such, client devices that may be used by software engineering employees of a business, as an example client device 110C, may access the server 160C in order to perform various software development tasks. In an example of another network architecture, LAN 101 can include multiple subnets that are assigned to each of the various departments described above. Thus, the network activity for a respective client, such as client device 110A can be characterized interacting with other network entities within its respective subnet.

In some scenarios, the client device 110C may access one or more additional servers, alongside of accessing code repository server 160C that may be assigned to an engineering department. The additional servers may provide services that are related to coding, for example, and can be used while the client device 110c is being used for working on software development projects. In an example, server 160D can act as a bug repository that keeps track of reported software bugs in software development projects. Accordingly, in some cases, client device 110C being utilized by a software engineer may access both server 160C and server 160D concurrently.

Each of the abovementioned examples can be generally described as exemplifying departmental workflows, or access trends of client devices 110A-110N with respect to the network resources within LAN 101 that may be assigned to their respective departments. That is, there can be access patterns established by the typical workflow of an employee within a department, for example. As described above, clients devices 110A-110N used by employees in a particular department, such as the financial department, engineering department, and the like can often times have similarly reoccurring network activity. For example, each employee may have a specific workflow involving repeated network activities. Even further, multiple employees may share similarities in their workflow on the departmental level, where employees in the same department have commonly shared network activities. Network activity with respect to these departmental workflows (or employee workflows) can also translate to transactions records that have identifiable similarities, such as similar source/destination pairs, repeated times and/or frequency of access, and other attributes relating to interactions between entities on the LAN 101. Over time, analyzing network activity, such as interactions relating to departmental workflows, can be indicative of trends that can be considered normal in the network. Patterns involving which client devices 110A-110N access which servers 160A-160N within the network can be identified, analyzed, and modeled. As an example, it may be observed that a user of client device 110A often times has the workflow of accessing e-mail server 160A Monday-Friday between 9:00 am-9:30 am (e.g., responding to emails at the start of the work day), working on a spreadsheet or a document on a document repository, followed by printing the spreadsheet/document on a secure printer.

Additionally, the disclosed NSP techniques also allows observing these regularly occurring access trends (or typical network behavior) as a baseline for a user, which can then be used in order to further predict network activity for that user. For instance, referring back to the example of departmental workflows, a baseline of network activity for "User A" employing client 110A can reflect that server 160A is regularly accessed. Even further, by determining that accessing server 160A every weekday morning constitutes normal network activity for "User A", NSP techniques may use this baseline to predict that is expected for "User A" to again access server 160A on the following Monday morning.

As illustrated in FIG. 1, the packet processor 130 can passively collect and analyze the traffic in a network, such as LAN 101. In the example of FIG. 1, the packet processor 130 can collect packets 120A-120N that are transmitted from and/or received by clients 110A-110 in accessing servers 160A-160N during an employee's normal workflow. In some cases, packet process 130 can collect other forms of intent to access messages including information relating to network interactions, such as discovery protocol messages as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety. Accordingly, these collected packets 120A-120N can be used to compile a log of transaction records (e.g., conversations) 143 at an analyzer 140. The transaction records 143 can then be analyzed using the NLP-based techniques disclosed herein. Transactions records 143 can include information communicated in accordance with one or more network discovery protocols, such as dynamic host configuration protocol (DHCP), a domain name service (DNS), a multicast DNS (mDNS) protocol, a link layer discovery (LLDP) protocol, a CISCO discovery protocol (CDP) that include information content about the network. Also, transaction records can include information in accordance with network protocols, such as transmission control protocol (TCP). It should be appreciated that other types of protocols and information that allows devices to operate in the network can be collected and analyzed using the techniques disclosed herein. An example of a log comprised of transaction records 143 that can be used by analyzer 140 is shown in FIG. 3A.

Also, FIG. 1 serves to illustrate that the analyzer 140 includes a network activity prediction module 141. The network activity prediction module 141 can program the analyzer 140 to execute various functions that allow the analyzer 140 to implement NLP-based sequence prediction with respect to predicting network behavior (e.g., predicting an interaction with an expected network entity based on interactions with a known sequence of network entities), in accordance with the NSP techniques described herein. Furthermore, according to various embodiments, the network activity prediction module 141 and components described herein may be implemented in hardware and/or software that configure hardware.

In some embodiments, the network activity prediction module 141 can be configured to create a crafted corpus from data indicative of network activity, such as the data included in transaction records 143. In NLP, a corpus can be defined as a body of words. In a similar manner, the analyzer 140 can generate a corpus, or sequence of "words" that forms the semantics used in network-based communication between entities on LAN 101. As an example, the analyzer 140 may be configured to analyze the network activity of a particular user whom accesses assets on LAN 101, for instance client device 110A. The analyzer 140 can perform NLP-driven analysis on data, from transaction records 143 for example, that is specific to the network activity that involves client device 110A. In some embodiments, the network activity prediction module 141 can generate a "crafted" corpus, as previously described. In continuing with the above example, the network activity prediction module 141 can particularly structure a crafted corpus in order to capture network activity of client device 110A in an network embeddings space. Thus, in a scenario, a crafted corpus formulated by the network activity prediction module 141 can include sequences of servers in LAN 101 that client device 110A interacted with during a single session, for instance.

In some embodiments, the network activity prediction module 141 can formulate a crafted corpus that is structured in accordance with one of three principal categories, including: 1) a crafted corpus of servers, per user (e.g., per session); 2) a crafted corpus of users, per server (e.g., per day); and 3) a crafted corpus of a group of users, per group of servers accessed. Additionally, in some instances, the same corpus can include a sequence of the source internet protocol (IP) address, for example, of the devices from which access to a server was initiated. In these example, the crafted corpus may group source IP address by server).

Figure 3B:
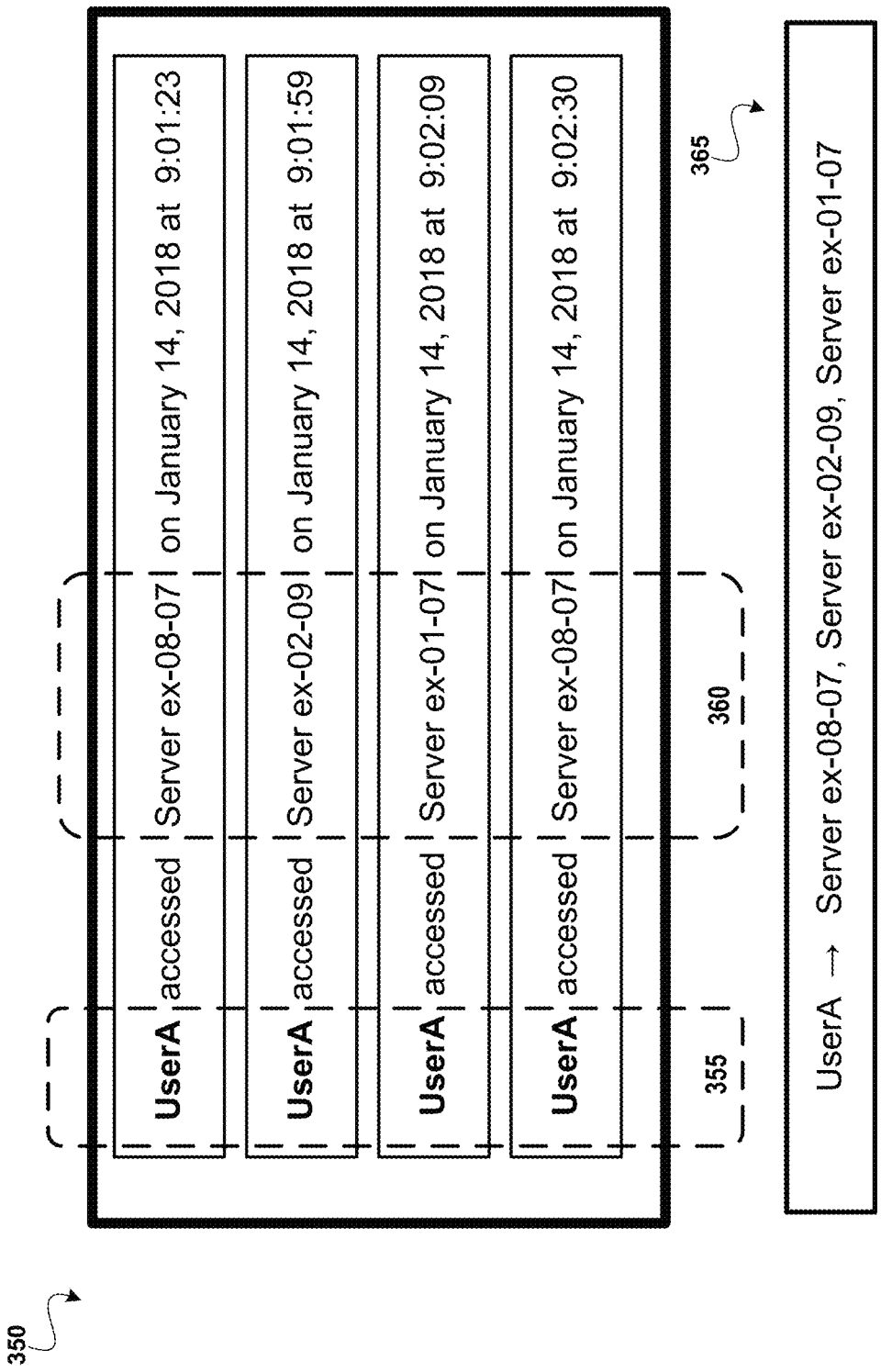
FIG. 3B illustrates an example of a crafted corpus for capturing a sequence of servers using data from the transactions log shown in FIG. 2A, according to some embodiments.

Although the aforementioned categories are described in detail for purposes of illustration, it should be appreciated that the network embeddings techniques can adapt a crafted corpus in a manner that does not fall under these categories. As such, a crafted corpus can be structed to represent any network entity (also referred to herein as network asset) or other data relating to network activity as deemed necessary and/or appropriate for a certain network security application. An examples of crafted corpuses is illustrated in FIG. 3B, and is discussed in greater detail below. In some instances, a crafted corpus can include data related to communication networks such as hostnames, protocol information (e.g., TCP), ports, IP address, MAC addresses, remote addresses, authentication information, activity description, timestamps, ping times, client devices, network users, network asset state information, log files, HTTP code, pages requested, user agents, referrers, bytes served, errors, active directory logs, proxy logs, etc. Further details regarding crafted corpuses are described in U.S. patent application Ser. No. 16/513,522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is hereby incorporated by reference herein in its entirety.

Furthermore, by executing the network activity prediction module 141, the analyzer 140 can use a crafted corpus to generate network embeddings. In general, network embeddings represent transaction records (related to an interaction between network entities) as vectors in a dimensional space. Thus, in the example of FIG. 1, the network activity prediction model may generate a network embeddings model that includes vector representations of the network assets in LAN 101. For example, the network activity prediction module 141 can extract each network asset, application name, and other deep packet information from the network transaction records in a crafted corpus and generate a network embeddings model, which includes vector representation exemplifying the presence of network assets that are proximate to each other (in the context of network activity) in a multidimensional space. As a general description, network embeddings as referred to herein may be implemented as a vector space model that represents (e.g., embeds) network entities in a continuous vector space. Consequently, semantically similar network entities can be mapped to nearby points (e.g., embedded nearby each other) within a network embeddings model. Network embeddings are discussed in greater detail in U.S. patent application Ser. No. 16/513,522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is hereby incorporated by reference herein in its entirety.

Figure 4A:
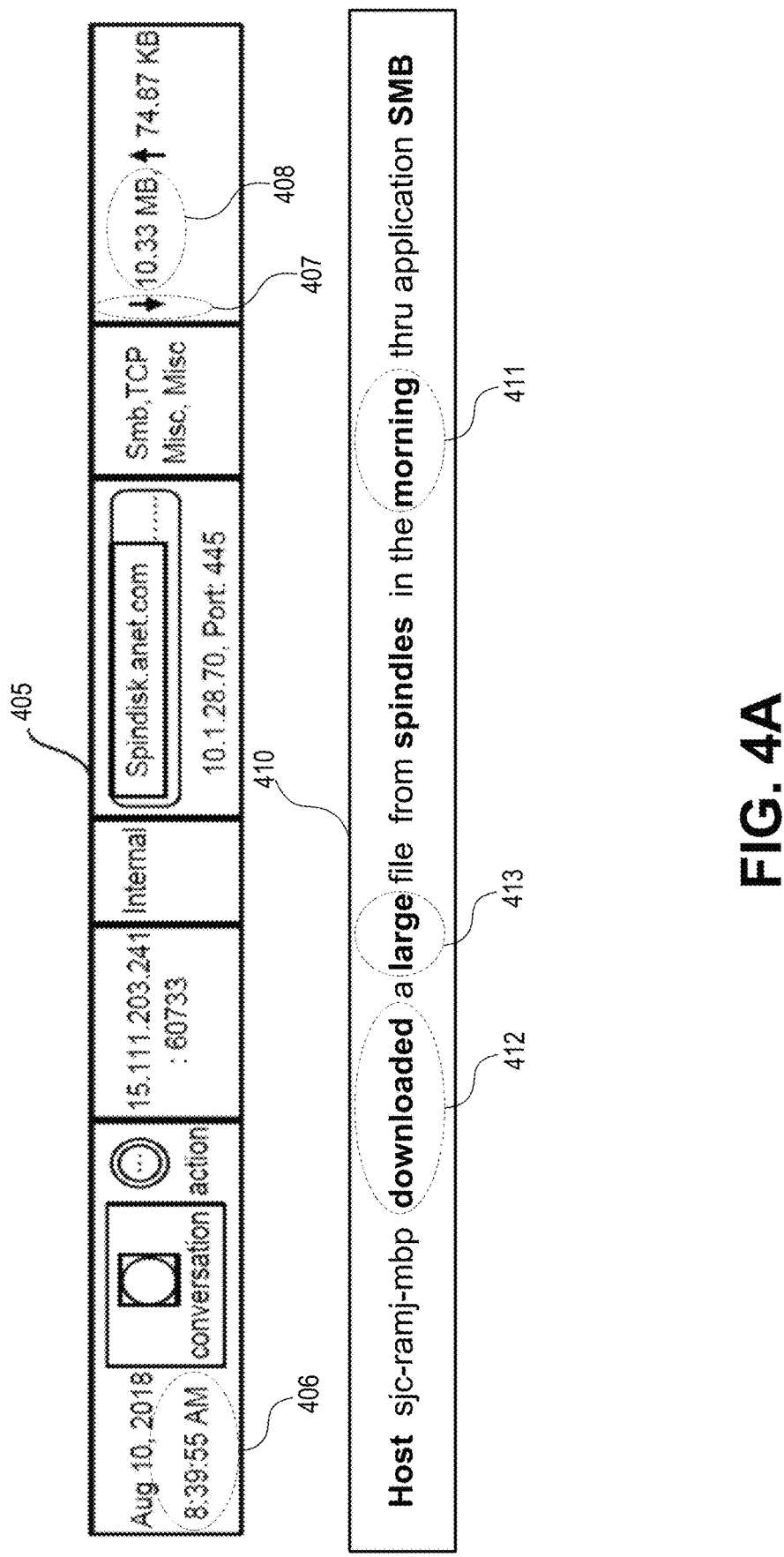
FIG. 4A illustrates an example of a network transaction record which has undergone regularization, forming a network sentence, according to some embodiments.
Figure 4B:
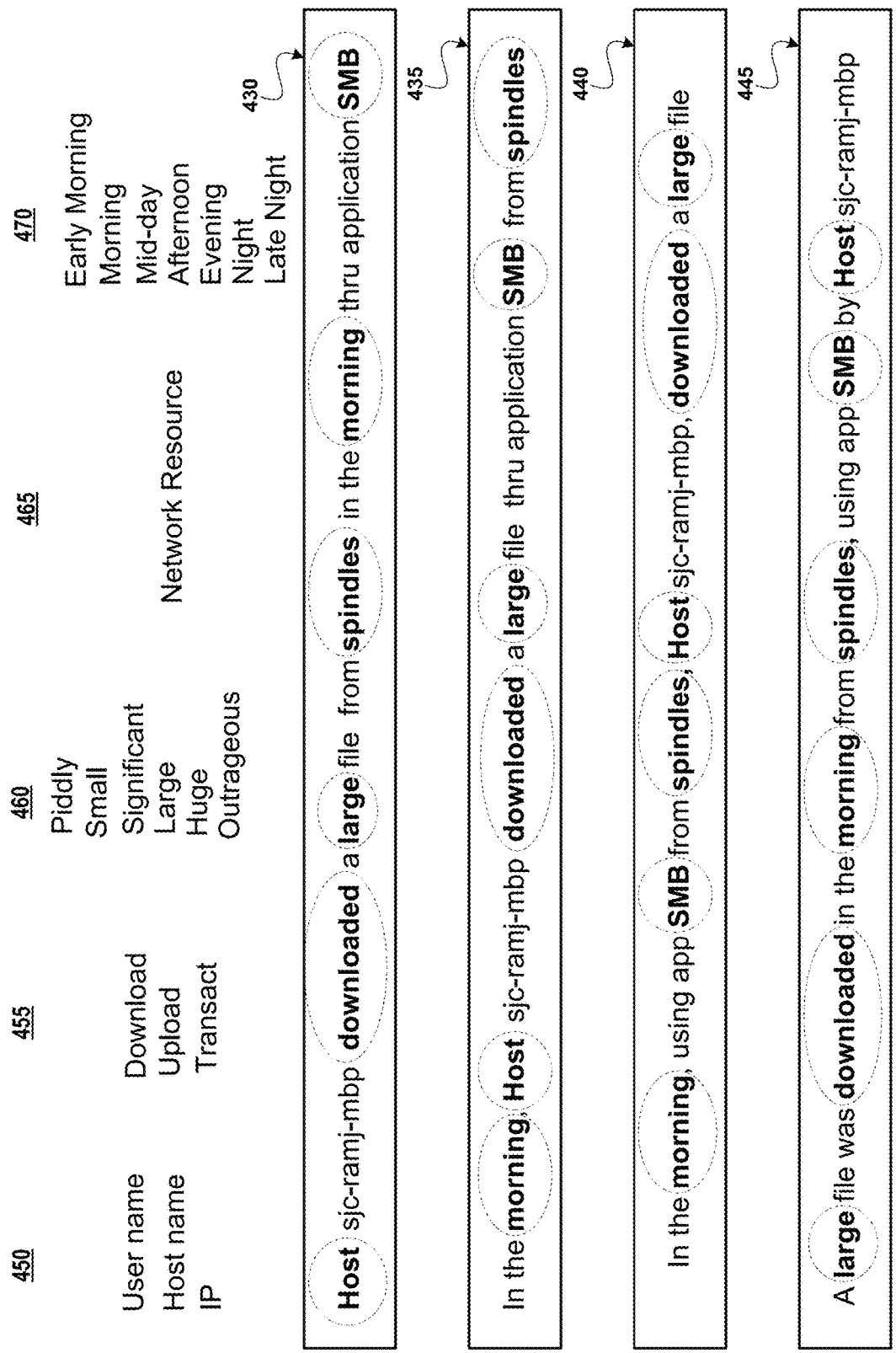
FIG. 4B illustrates examples of the network sentence in FIG. 4A, which has undergone rephrasing to produce multiple arrangements of the same network sentence, according to some embodiments.

Also, FIG. 1 shows that the analyzer 140 can include NSP model(s) 144. Typically, training the NSP model(s) 144 also involves the NLP-driven aspects of creating a crafted corpus and deriving network embeddings, as previously described. According, using the network embeddings (which represents network entities in a multidimensional vector space) the NSP can predict a missing, or unknown dimension. For example, with respect to a network interaction, the NSP model 144 may have enough information to derive several of its dimensions in a vector space. FIG. 4B illustrates examples of dimensionalities that can be derived relating to a network interaction. As a general description, FIG. 4B shows an network interaction having dimensions that include: a user name 450, direction of traffic 455, file size 460, resources 465, and time of day 470. Using these known dimensions, the NSP model 144 can be trained to make a prediction for another dimension. Furthermore, predicting a missing dimension pertaining to a network interaction can further translate to predicting an "expected" network entity for the interaction. As such, the NSP model 144 can produce predictive information relating to network activity in a manner that is meaningful to network security applications.

Additionally, FIG. 1 shows a client 150 including a network security interface 151. The client 150 may be a client device having network analysis applications, such as the network security interface 152, that consumes the analytical data processed by analyzer 140. As an example, the client 150 can be a desktop, a laptop, or a mobile device such as a smart phone, a tablet, or any other portable computing device that can be used by a network administrator for monitoring a network, such as LAN 101. In some instances, the client 150 and the analyzer 140 are communicatively connected via a network (not shown) allowing communication of data between the devices. In the embodiments, the network security interface 152 includes executable instructions, computer components, or a combination of both that implement various network security related capabilities, including presenting visual, graphic, or image components relating to predictions of network activity generated by analyzer 140.

In the illustrated example of FIG. 1, a visual indication, shown as "potential security event" is generated as output from the network activity prediction module 141 that is displayed via the network security interface 152. As an example, in response to monitoring network activity of "User A" within LAN 101 using the disclosed NSP techniques, it may be determined that there is a deviated between network activity of "User A" that is being actively monitored by the system 100, and the predicted activity for "User A" as determined based on the the disclosed NSP techniques. Referring back to the departmental workflow example, it may be predicted that a monitored network interaction for "User A" on a Monday morning involves accessing server 160A, as "User A" typically access their e-mail at the start of the workday. However, the analyzer 140 may detect that "User A" has accessed finance server 160D during monitoring the user's network activity. In this scenario, the network security interface 152 may display an alert window (or another type of indication deemed appropriate) that a "potential security event" has occurred on the network, based on the observed deviation between the predicted activity and monitored activity. Thus, system 100 applies sequence prediction, in order to provide predictive insight on network interactions represented in an embedding space, which in turn provides context-rich information for purposes of network security.

An anomaly, as referred to herein, may be an event that deviates from what is standard, normal, or expected. Generally, network security systems are designed to identify anomalies as events that are more likely to indicate unauthorized access, misuse, malfunction, modification, destruction, or improper disclosure. Some existing network security techniques can also train, but this training is typically done only on labelled datasets that have sequences leading up to malicious domains. Thus, some of the existing techniques can train in a supervised way to accomplish a form of prediction. In contrast, the disclosed NLP-driven techniques allow for training on unlabeled dataset on a per-enterprise basis (where transfer learning does not help much) by training embeddings. Embeddings can be trained with an unsupervised learning technique. Accordingly, the disclosed techniques can take unlabeled data, and then ultimately predict the "usual" behavior with a scale of deviation when deviating from that "usual" behavior. By eliminating the need for processing labels on top of the already vast amounts of data, the prediction techniques disclosed herein can realize improvements over the existing approaches.

Furthermore, the inability for a network security system to effectively distinguish between simple outliers and anomalies often leads to false positives. A significant degree of false positives can cause network security administrators to lose confidence in a network security system to generate quality alerts which may make the network system even less secure due to a lack of sufficient inspection. However, system 100 leverages the power of NLP-driven processing to facilitate the network security interface 152, and mitigate false positives (e.g., easily identify simple outliers) to improve the overall accuracy of detecting anomalous network behavior by using network embeddings. For instance, the network security interface 152 may present a measurement (e.g., a percentage) of deviation compared to the baseline, and even further a measurement which pertains to the severity (e.g., benign or malign) of the deviation. A deviation involving a server being accessed at a different time by a user may be considered less severe than an attempt to access server that has never been previously accessed by that particularly user. In general, a large deviation between predicted activity generated by the network activity prediction module 141 and monitored activity and may indicate a larger likelihood of a security threat (e.g., anomalous network activity). In contrast, a small deviation between predicted activity generated by the network activity prediction module 141 and monitored activity might suggest that the network interaction may be a simple outlier.

In some cases, network security interface 152 can be a visual representation of a topological view of a network (based on semantics learning), having visual cues, for identifying network entities, network activity and traffic in networks. Furthermore, a user can interact with the network security interface 152 to allow a visualization to be generated in an interactive manner. For instance, the network security interface 152 can receive input from a user (e.g., select a simple outlier) that modifies to the visualization. The client 150 can include an input device, and an output device. Input device may include a mouse, a keyboard, a touchscreen, and the like, that can be utilized by the user to interact with the visualization. An output device of the client 150 may include a display, a touchscreen, a microphone, and the like, which displays a visualization. In some embodiments, input device and output device of the client 150 may be included in the same unit (e.g., a touchscreen).

In accordance with the embodiments, utilizing network embeddings to model network activity can be leveraged to identify nominal network activity for the purposes of network monitoring and/or security. For instance, in referring again to the examples described above, network interactions within LAN 101 can be analyzed in the context of their departmental workflow, and described as: client device 110A used by a staff employee commonly accesses server 160A acting as an e-mail server; client device 110B used by an accountant has commonly accesses server 160B acting as a finance server; and client device 110C used by a software engineer commonly accesses servers 160C and 160D acting as code repository and bug repository, respectively. Network embeddings can capture the sequence of server accesses by a user and can embed the semantics of the server according to departmental rules, trends, and/or purpose of the resource on the network. For example, when a word embeddings model is employed to train an example corpus, a network embedding may group a plurality of finance servers and engineering servers in proximity of each other, respectively, in a high-dimensional embeddings space. Then, the network security interface 151 can generate a visualization of the network embeddings. As an example, servers that are determined to be a part of a workflow for a user can be shown in the visualization as nearby points (also referred to as forming a cluster). A user interacting with the network security interface 152 can then interpret the visual data, making network activity within the network visually discernable. As shown in the example of FIG. 1, the visualization interface 152 can present a visualization including clusters that are identified from user interaction. A user can enter user input into the visualization interface 152, such as haptic input using a touchscreen, in order to highlight a group of proximately located points in the visualization of the embeddings (illustrated as circular outlines around points of the visualization in FIG. 1). In some embodiments, the system 100 can perform translating the network embeddings model in a multidimensional space into the visualization generated in a reduced space (e.g., two-dimensional or three-dimensional space) using a NLP-driven visualization techniques as described in detail in U.S. patent application Ser. No. 16/513,522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is hereby incorporated by reference herein in its entirety.

In some embodiments, the system 100 can perform interactive device clustering using hierarchical distance as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety. For example, the visualization interface 152 may present a graph which represents client devices 110A-110N on LAN 101 that are measured as having small distances from each other, as determined by the distance algorithm, as a cluster of nodes. Alternatively, the graph displayed within visualization interface 152 can show client devices 110A-110N on LAN 101 that are measured as having large distances from each other, as determined by the distance algorithm, as individual nodes separated by edges (having a length that is commensurate with the calculated distance).

Referring now to FIG. 3A, an example of a transactions log 300 is shown. As seen in FIG. 3A, the transaction log 300 can include multiple records of servers accessed within a communications network. A corpus may be generated from the transactions log 300, in accordance with the network embeddings techniques disclosed herein. As previously described, a corpus can be crafted to include formulated text or sequences based on the semantics intended to be captured. In some embodiments, generating a corpus (e.g., crafted corpus) includes tags, headings (e.g., column headings in spreadsheets), column names (e.g., from databases), and the like, as information to extract useful semantics.

In the example shown, transactions log 300 includes several entries 303, where each entry is a record of a transaction (e.g., activity within a computer network). As shown, transactions log 300 includes lists of data 302a-302d that are organized into several different categories, including: "ServerName" 350; "DatabaseName" 351; "LogsGenerated" 352; "DurationInSeconds" 353; "Usernames" 354; and "TimeStamp" 355. Data 302a-302d, for example, contained in the transactions log 300 can be used to create a crafted corpus, as will be explained in more detail below. In the illustrated example, the transactions log 300 includes a list of network assets, shown as "ServerName" 350. The "ServerName" 350 category be a list of servers which have been requested to perform tasks in a certain network. Also, transactions log 300 is shown to include a list of database names, shown as "DatabaseName" 351. The "DatabaseName" 351 category can include a list of databases that are accessed by users, where the particular users are listed under "UserNames" 354. Remaining categories shown include "LogGenerated" 352 listing the number of logs generated, the "DurationInSeconds" 353 which lists a duration of a session (in seconds) when the servers were accessed, and "TimeStamp" 355 listing the timestamps for each entry.

Subsequently, the network embeddings techniques disclosed herein can extract network activity data from available sources, such as data 302a-302d from transactions log 300, in order to generate a crafted corpus. In an example, a user associated with user name "User A" may be an employee in the finances department, and accesses a server "ex-08-07" that is assigned to a subset of the financial department, while working on January 14 at 9:01:23 AM. Accordingly, entry 303 is an example of a record in the transaction log 300 that may be generated based on that network activity associated with "User A." The entry 303 lists the user, the server accessed by the user, the duration, and time stamp that is associated with that interaction. In some instances, the entry 303 (i.e., "User A" accesses server "ex-08-07") may reflect the type of network activity that is typical behavior in the context of "User A." Accordingly, an analyzer (shown in FIG. 1) implementing network embeddings techniques can formulate a type of crafted corpus that ties a user with a sequence of servers that each user accessed.

As previously described, a corpus of "words" within "sentences" relating to network activity (also referred to herein as network sentences) can be particularly crafted based on the entities intended to be captured in a unified embeddings space. In FIG. 3B, an example of a crafted corpuses that may be generated using the network embeddings techniques are illustrated. FIG. 3B shows an example of a crafted corpus 350 of sequences of servers 360 that are grouped for a particular user. As previously described, the disclosed network embeddings techniques can be used to generate a "server sequence" category of crafted corpus which specifically captures a sequence of server interactions that are grouped per user, per session. In the example, the crafted corpus 350 is structured for capturing server interactions involving "UserA" 405. As seen, the crafted corpus 350 includes a sequence of servers 360 that have been determined to be accessed by "UserA" 405 (based on NLP-driven analysis of transactions record shown in FIG. 3A). The sequence of servers 360 grouped to "UserA" 355 in the crafted corpus 350 includes servers named "Server ex-08-07", "Server ex-02-09", and "Server ex-10-07." FIG. 3B also illustrates an example of a semantic relationship 365 that can be understood from network embeddings derived from the crafted corpus 350, which can be analogous to word embedding derived from semantics of a sentence in natural language. The semantic relationship 365 groups interactions with servers "Server ex-08-07", "Server ex-02-09", and "Server ex-10-07" to the network activity of "UserA."

Referring back to the example discussed in reference to FIG. 1, "UserA" 355 may operate a computer assigned to the financial department, and the servers in sequence 360 ("Server ex-08-07", "Server ex-02-09", and "Server ex-10-07) may be within the subnet utilized by the financial department to specifically support financial applications. In capturing the sequence of servers 410 that have been accessed by "UserA" 355 in the crafted corpus 350, and modeling this over time, the embeddings space may represent a group of servers that "UserA" 355 typically interacts with during his (or her) normal activity in the context of the financial departmental workflow. As an example of a visualization, the crafted corpus 350 may yield an embeddings space that represents network activity for "UserA" 355 in a multidimensional space that is then visualized in a reduce dimensional space, like a 2D or 3D space (using various techniques that are standard for embedding visualization in NLP). Based on the relation represented in the visualization, cohesiveness (or contextual relationships) between network entities can be presented visually. For instance, a network embedding relating to the example can be visualized where the sequence of servers 360 are grouped together in closed proximity, indicating that these servers are common interactions with respect to the specific user, namely "UserA" 355. Consequently, the network embeddings techniques can use crafted corpus 350 in a manner that allows a network security application to discern between interactions with certain servers that are contextually similar with respect to a user, or interactions with servers that may be dissimilar, or anomalous, for a user as captured in the unified embedding space.

In addition to the crafted corpus 350, the network entity prediction techniques can use transaction records (or flow records) that are expressed in natural language, also referred to as network sentences. The example in FIG. 4A shows a network interaction in the form of a flow record 405 that has been regularized, representing data from the record in a network sentence, using words that having meaning to express certain parameters, thereby providing language context to the network interaction. In the illustrated example, the network sentence 410 includes "Hose sjc-ramj-mbp downloaded a large file from spindles in the morning thru application SMB." Generally, regularization provides improvements to NLP-driven techniques by reducing cardinality and capturing more of the human factors (summarization). In some sense, regularization can also be considered as reducing cardinality of the features themselves.

As an example of expressing record data as a natural language "word" in a network sentence, a time element 406 in the flow record 405 is highlighted (circled using dashed lines). The time element 415 in the flow record 405 is indicative of time related to the interaction, shown as "8:39:55 AM." In the network sentence 410, this element is encoded in human terms (natural language), shown as word 420 "morning" (circled using dashed lines). In this example, the network sentence 410 has been regularized to expresses the time element 415 in a manner that gives additional context and meaning to the interaction. In other words, a human can interpret the network sentence 410, easily recognizing its temporal-context suggesting that the interaction occurred in the morning. The context involves taking into account the time zones and human interpretation of the range of time within a day considered morning, evening and mid-day. Also, context may take into account any cultural or regional variations relating to interactions, such as using words that have a cultural context to describe when users get on, or leave, a network. Generally, encoded terms that can be used for expressing a time element 415 in a network sentence, such as network sentence 410, are descriptively representative of a time of day for a language, such as "morning", "evening", and the like.

As another example, the flow record 405 includes a transfer (direction) element 407, which indicates a particular type of data transfer associated with the interaction, such as download or upload. In the illustrated example, the transfer element 407 in flow record 405 is a down arrow, which signifies that the interaction involved downloading of a data. The transfer element 407 in encoded in a natural language within sentence 410 as word 412 "downloaded". Also, the flow record 405 includes size (file) element 408, which indicates the size of the data that is transferred during the interaction. In the illustrated example, the size element 408 in flow record 405 is "10.33 MB", indicating the size of the downloaded file(s). The size element 408 in encoded in a natural language within sentence 410 as word 413 "large". It should be appreciated that a network sentences, such as a network sentence 410, can utilize other types of descriptive terms that can provide contextual value to an interaction, as deemed appropriate. As an example, the terms used can be a configurable feature of the disclosed NSP techniques, allowing a user, such as network administrator to set the terms used for the encoding as appropriate for a particular application (e.g., broader terms that can capture neighboring time ranges without explicit configuration). Example of natural language terms that may be used for the encoding include, but are not limited to: time of day (e.g., "Morning", "Afternoon", etc.); a transfer (e.g., "upload", "download", etc.); and a size ("large", "small", etc.). Moreover, one or more different regularization methods may be applied to log records and/or flow records in order create regularized network sentences, as disclosed herein.

In an approach, a corpus used for NLP techniques can include multiple variations of network sentences. FIG. 4B illustrates this concept, showing networks sentences 435, 440, and 445 which are variations of the same network sentence 430 (also shown in FIG. 4A). Each of the networks sentences 430, 435, 440, and 445 include substantially the same words, but rephrased, having the words arranged in a different sequence. FIG. 4B also shows that each of the network sentences 430, 435, 440, and 445 include the same dimensions (shown in bold and circled with dashed lines). The dimensions of the data represented in each of the network sentence 430, 435, 440, and 445 can correlate to groups of keywords 450, 455, 460, 465, and 470, which are used for regularization. By employing these keywords groups 450, 455, 460, 465, and 470, each dimension can be encoded with a human interpretable vocabulary for the variation of the data in those dimensions. As such, regularization can reduce cardinality and capture more of the human factors (summarization). In some sense, regularization can also be considered as reducing cardinality of the features themselves.

For instance, keyword group 450 includes "user name", "host name", and "IP" which can be the keywords that are linked to a dimension shown in the network sentences 430, 435, 440, and 445 as "Host." In general, keyword group 450 includes natural language terms that can describe a source for a network interaction. The keyword group 450 can be correlated to a Username or Hostname, for instance. As an example, Introspect uses DHCP logs (and traffic) or reverse DNS to obtain the hostnames. The Username can be correlated either to Active-Directory logs or sources such as AMON data (e.g., exported from Aruba™ products). Keyword group 455 includes words that can describe the direction of traffic involved in a network interaction. Examples of words included in keyword group 450 are shown as "download", "upload", and "transact." The direction relating to a network interaction can be determined DPI information like GET or PUT, for instance in the case of HTTP transactions. Direction information can also be based on the pure volume of traffic in upload and download directions. The keyword group 460 can be correlated to a file size. Words used in the keyword group 460 can qualitatively describe data sizes, including: "piddly", "small", "significant", "large", "huge", "outrageous". Keywords relating to file size, such as "piddly", "large", and "huge", can be humanly interpreted ranges based on absolute sizes. As an example, a megabyte (MB) can correspond to the keyword "large", a gigabyte (GB) can correspond to huge and terabyte (TB) can be linked to the keyword "humongous". Alternatively, keywords can represent relative sizes by comparing the distribution of the data sizes against standard distribution models or simple statistical analysis. For instance, the file size dimension can be a simple K-means as an example of a statistical analysis, with predefined set of clusters finding the centroid for each group. In other cases, the keywords can use absolute/relative terminology.

In some instances, the file size can be explicitly encoded using language such as "tens-of-mega-byte" or "hundreds-of-kilobyte." By using words that are directly related to unit of measurement typically applied to data files, the data can be more precisely quantified, while still increasing cardinality. Keyword group 465 is shown linked to the word "network resources." This dimension can include corporate resources that are identified by the domains DHCP, and using DNS to identify the assets of interest. As alluded to above, words included in keyword group 460 describe time aspects relating to a network interaction. In the example, keyword group 470 includes the terms "early morning", "morning", and "mid-day", "afternoon", "evening", "night", and "late night." The key word group 470 can be used to incorporate the time-zone of the user, and a broad range of time that qualifies for that window. These terms, which provides a broad temporal context to an interaction, can also characterize multiple information in a single dimension. It should be noted that this example is not intended to be limiting, and the regularization of network sentences, such as sentences 430, 435, 440, and 445 can include other terms and/or keyword groups not illustrated in FIG. 4B.

Figure 5:
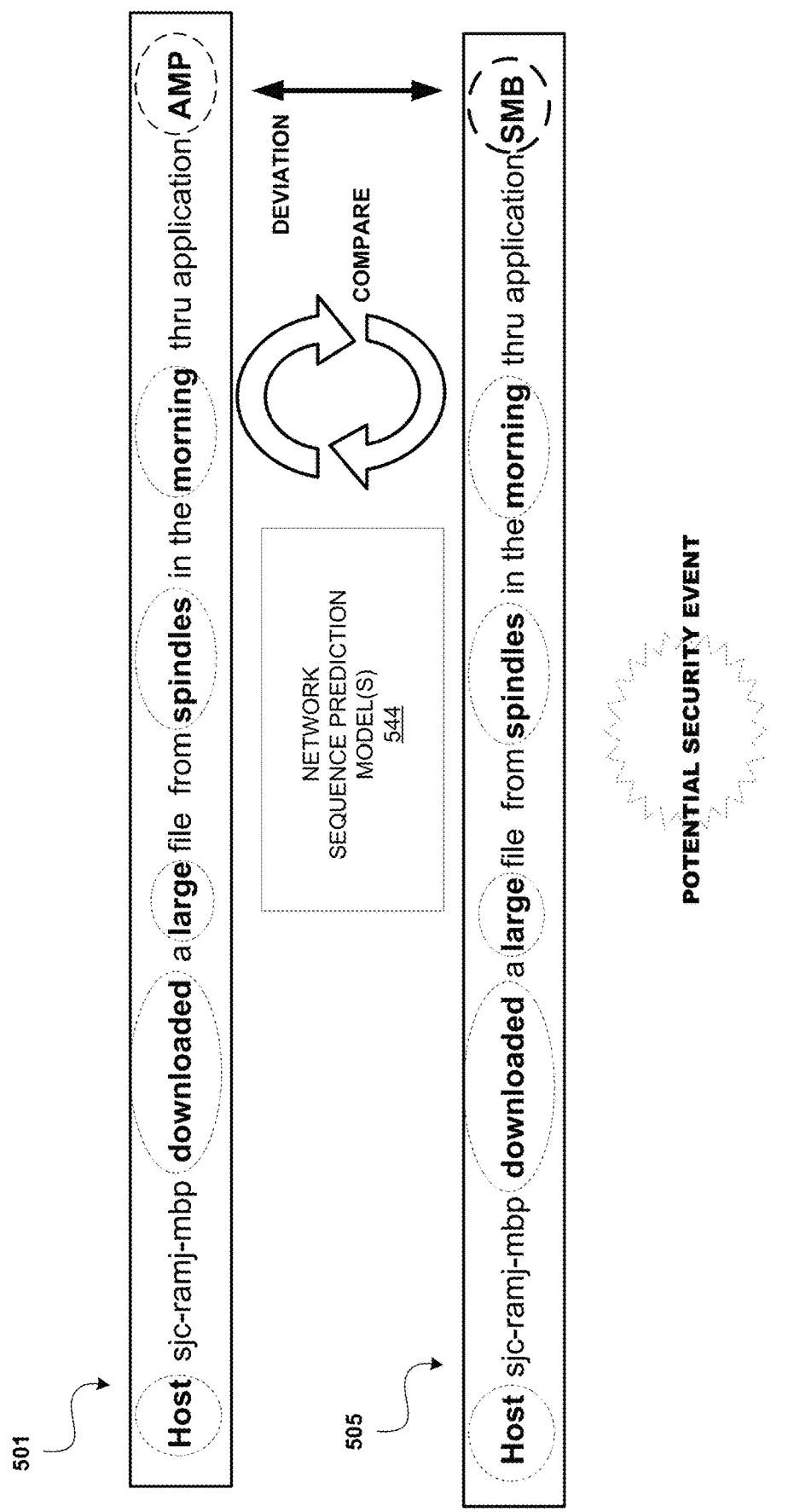
FIG. 5 is a conceptual diagram of an example of NSP model functionality, according to some embodiments.

Now referring to FIG. 5, a conceptual diagram, illustrating an example function of the NSP model 544 is shown. In some embodiments, the NSP model 544 is implemented as a neural model configured to generate a sequence of output text given input text. This is illustrated in FIG. 5, by the NSP model 544 receiving network sentence 501 as input, and producing network sentence 505 as the output. As previously described, NLP-driven sequence prediction models can be adapted to accomplish various NLP tasks that can be formalized as predicting outputs given inputs, and can be particularly adapted to serve different purposes (e.g., due to different inputs and desired outputs). In accordance with the embodiments, the NSP model 544 is trained on data related to network interactions, such as a corpus of derived network sentences and network embeddings. Accordingly, as a result of training over time, the NSP model 544 can learn implicit semantic and syntactic relationships in analyzed network sentences, allowing the dimensions represented in these network sentences to also be learned.

The NSP model 544 can map an input sequence, illustrated as network sentence 501, to a vector representation, for instance using the disclosed network embeddings techniques. Embeddings for network sentences can be attained by composing word representations from the network embeddings model, where values of the dimensions in the representation of the network sentence can also be attained. Then, the NSP model 544 can sequentially predict the specific semantic dimensions for that sequence (including an unknown dimension) based on the obtained representation. In some cases, the NSP model 544 can be implemented as a sequence-to-sequence (SEQ2SEQ) model, which is a simple NLP sequence model. SEQ2SEQ models can particularly define a distribution over outputs and sequentially predicts tokens given an input sequence. For each time step in prediction, a SEQ2SEQ model can combine a current token with a previously built embeddings for next-step word prediction. Thus, the SEQ2SEQ model generates an output sequence constructed based on the sequence of inputs from the pre-obtained representation. In scenarios where sequences are substantially larger, more advanced techniques like attention models may be used, as opposed to SEQ2SEQ (which may be more suitable for smaller sequences). Alternatively, sequences of bigrams (sequence of two) is a common phenomenon in network data as well. An example of a bigram is "authenticate and access", in which case the server accessed will often be seen with the authorization server. When the tuple is replaced with a meta-server representation, additional deduplication is possible when the tuples recur in a sequence. The identification of such recurrence is not possible in the initial data cleanup steps, but during the initial embedding analysis, where the tuples may end up showing one top of another (or 0 distance) or much closer that help identify them.

In the illustrated example, the NSP model 544 receives the input sequence, which is shown as network sentence 501 "Host sjc-ramj-mbp downloaded a large file from spindles in the morning thru application AMP." By applying the above-mentioned prediction techniques, the NSP model 544 can analyze the dimensions of network sentence 501 (based on its vector representation), and predict the dimensions for an output sequence. In the example, the NSP model 544 predictively maps the received input sequence, network sentence 501, to the output sequence, shown as network sentence 505. In the particular example, the NSP model 544 has been trained on a corpus of network sentences (shown in FIG. 4B), where the corresponding interactions all involve the same application, "SMB." Thus, the NSP model 544 has been trained to learn the relationship between most of the dimensions in the network sentence 501, including "Host", "downloaded", "large", "spindles", and "morning". However, the NSP model 544 has been trained to predict that the presence of these aforementioned dimensions specifically correlate to the another dimension, having the value of "SMB." It is important to note that the predicted application "SMB" in the output network sentence 505 is different from the application "AMP" included in the input network sentence 501. Thus, the NSP model 544 outputs its sequence, predicting the network entity of "SMB." As a result, the prediction from the NSP model 544 can be used to identify that there is a deviation between the monitored network activity and the predicted network activity. For example, the input sequence, or network sentence 501 captured from actively monitoring the activity occurring on a network, can be compared to the predicted output sequence, or network sentence 505 which is based on training the NSP model 544 on network activity observed over time.

FIG. 5 illustrates that there is a deviation between the monitored application of "AMP" for the interaction, and the predicted application "SMB." In this scenario, the deviation may indicate that the system has monitored activity (represented by network sentence 501) where the user has accessed an application "AMP" that is not been previously seen in the user's typical behavior. Furthermore, this deviation can be used by network security functions of the system to indicate that a potential security threat event has occurred.

Figure 6:
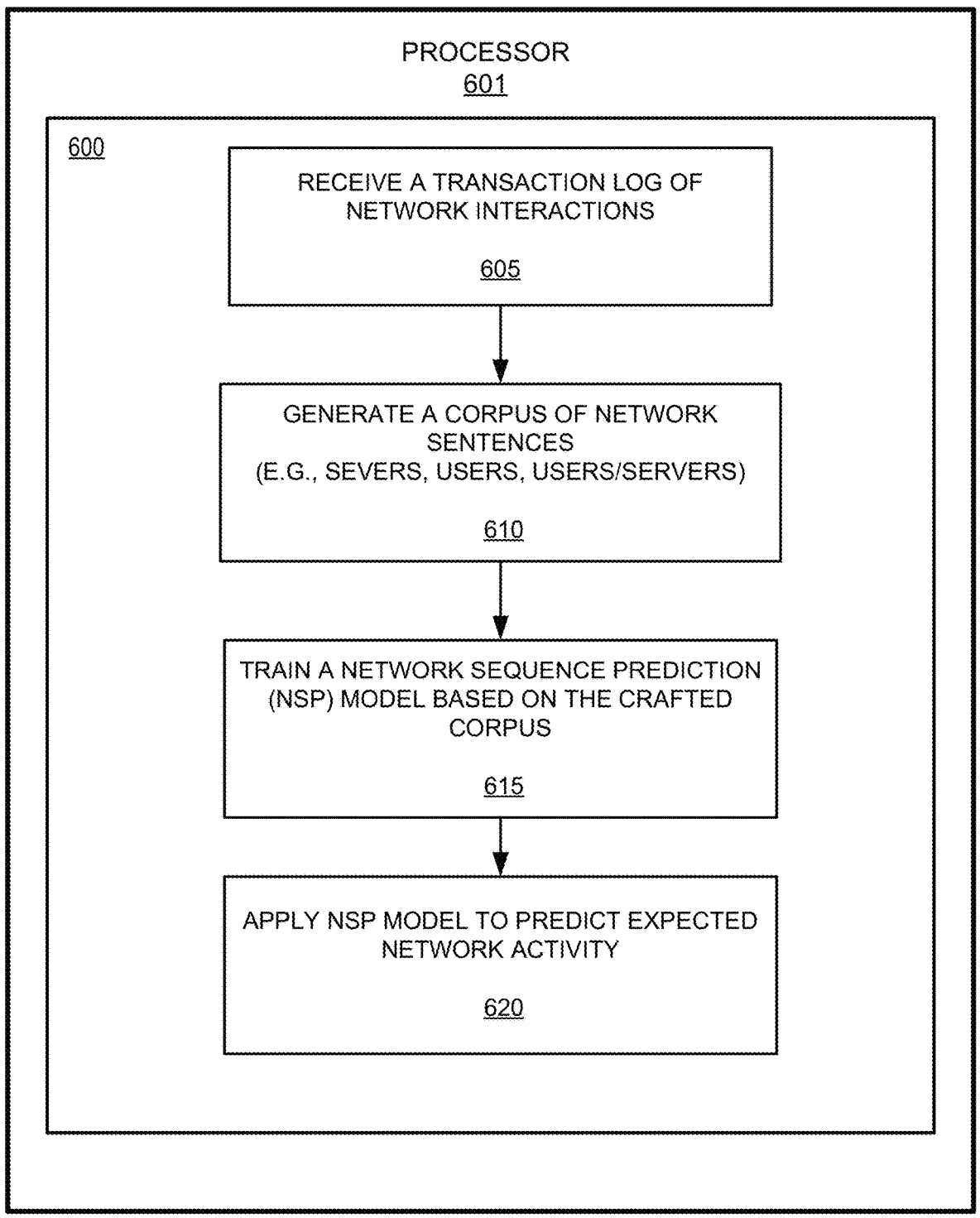
FIG. 6 is an operation flow diagram illustrating an example of a process for executing network analytics using NSP techniques, according to some embodiments.

Referring now to FIG. 6, an operation flow diagram illustrating an example of a process for executing network analytics using the disclosed network entity prediction techniques is shown. Process 600 is illustrated as a series of executable operations performed by processor 601, which can be the analyzer (shown in FIG. 1), as described above. Processor 601 executes the operations of process 600, thereby implementing the disclosed network embedding techniques described herein.

The process can begin at operation 605 wherein transaction logs of network interactions are received. For instance, a plurality of transaction records (comprising a transaction log) associated with specific network interactions between entities in a communication network, are received by a network analyzer (shown in FIG. 1). Examples of transaction logs (including information that is indicative of network activity) that can be collected at operation 605 are shown and described above in reference to FIG. 3A. Also, in some embodiments, operation 605 can include collecting flow records, such as flow records including DPI information. Moreover, although process 600 is described in relation to transaction logs and flow records, it should be appreciated that network entity prediction can be applied to other types of data that may be high in information content about the network. For instance, NLP-based approaches, namely network embeddings, can be applied to various types of packets, records, or messages, that enable devices on a network to announce information related to its configurability (e.g., services and associated parameters) and accessibility in a manner that allows the devices to discover, connect, and communicate with each other on the network. In some embodiments, network embeddings approaches can be applied to discovery protocol traffic (and intent to access messages). As an example, metadata from collected packets that may be present in discovery protocol traffic can be analyzed using NLP, such that the information can be used to derive network analytics. Discovery protocols consistent with the present disclosure may include a dynamic host configuration protocol (DHCP), a domain name service (DNS), a multicast DNS (mDNS) protocol, a link layer discovery (LLDP) protocol, a CISCO discovery protocol (CDP), and many more that are low in volume, but high in information content about the network. Applying text-based analysis, namely NLP, to network traffic that has high informational content about the network and the devices thereon, such as discovery protocol messages, is an underlying concept for NLP-driven network analytics.

Additionally, embodiments can include mechanisms for passively collecting and analyzing discovery traffic. For example, the network analytics system disclosed herein can leverage edge devices to listen to discovery protocol traffic within the network, allowing network interactions to be collected in a manner that is passive (e.g., listening, intercepting). Using passive data collection to drive network embeddings can provide advantages over some existing network analytics systems, which employ mechanisms that inject additional traffic into the network that is solely for the purpose of analysis. The system provides a minimal footprint by deploying fewer packet processing devices at strategic points in the network architecture (e.g., edge devices). The process 600 can include applying NLP-driven techniques to discovery protocol traffic (or intent to access messages) in network interactions (e.g., during device discovery and/or advertisement) for network analytics as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety.

Next, the process 600 can continue to operation 610. At operation 610, a corpus of network sentences can be generated from the transaction log. In some embodiments, a corpus can be crafted, or particularly formulated to capture certain network entities in the embeddings space. In the case of crafted corpuses, generation can be based on a selected corpus category. Thus, operation 610 can produce a crafted corpus (in response to the selected corpus category) that is aligned with the type of access semantics to be captured by an embedding, thereby being generally formed on a per-user, per-server, or per-server group basis. As alluded to above, network embeddings techniques can include formulating a crafted corpus that is structured in accordance with one of three principal categories, including: 1) a crafted corpus of servers, per user (e.g., per session); 2) a crafted corpus of users, per server (e.g., per day); and 3) a crafted corpus of a group of users, per group of servers accessed (where the same corpus can also have sequence of the source IP of the devices from which the access were made to a server, grouped by the server). Generating a crafted corpus is described in detail in U.S. patent application Ser. No. 16/513,522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is incorporated herein in its entirety.

Furthermore, operation 610 can involve various NLP techniques, such as extracting text from the transaction logs received in operation 605, and then applying text-based analysis. In some cases, the plurality of transaction logs can be analyzed using NLP-driven approaches in order to identify the network entities associated with a particular interaction from the information in the transaction records. In other words, operation 610 involves discerning unique parameters in transaction records as text strings that can be further analyzed to distinctly identify various network entities such as users, servers, devices, and the like, as deemed appropriate for analyzing network activity.

Referring back to the example of the selected crafted corpus being a sequence of servers grouped per user, operation 610 can involve additional aspects to formulate the designated crafted corpus. There may be a cleanup step in operation 610, where generation of corpus includes crucial data cleanup and preparation before formulation of the corpus. In some instances, the cleanup/preparation can depend on formulation (further formulation depending on use-case).

In order to generate the crafted corpus of the selected corpus category, a subset of transaction records within a specified time period may be analyzed. The subset of transaction can be specifically analyzed in order to identify users associated with each of the network interactions. Then, the records in the subset that are associated with an identified user are further analyzed. This analysis can involve identifying a sequence of servers for the particularly identified user. As an example, the subset of transaction records can be analyzed for each user, where the servers that are accessed by each user may be identified as text strings within the transaction records (corresponding to a respective user). Accordingly, the crafted corpus generated in operation 610 can include a sequence of servers by grouping the servers extracted from the subset of transaction records for the identified user.

In some cases, operation 610 can include regularizing the transactions records which are used in formulating the corpus. Generally, regularization is used to capture semantic meanings of text in the transaction records. Thus, as a result of the regularization, a crafted corpus can be formulated to include network sentences, using natural language terminology to represent the corresponding network interaction. Examples of network sentences are shown in FIGS. 4A-4B. As such, operation 610 can produce a crafted corpus of network sentences, connecting the text therein to a specific contextual meaning (with respect to language), generally making the sequences in the corpuses more comprehensible (e.g., to human interpretation). For example, according to the embodiments, network sentences include understandable natural language terms, such as "downloaded" and "morning", providing connotation and underlying context to network activity. That is, a network sentence including the term "morning" signifies a time frame in which the interaction occurred, which is understood based on the meaning of the word. Representing data in a human interpretable way, can help capture the semantics of the interpretations. Furthermore, regularizing the prediction model, namely the NSP model, can reduce the presence of outliers that may otherwise be captured in network analytics, thereby increasing accuracy (e.g., detecting true anomalies) and increasing confidence in the security functions of the system (e.g., less false alarms). In addition, a workflow can be used to tag any determined false positives, further tuning the predictions of "expected" behavior. Additionally, operation 610 can include a step of labeling, such as labeling a group of servers as "engineering servers". As a result, these labels can also be used in the network sentences as another way of imparting the human context into the dataset.

Also, in some embodiments, generating a corpus of network sentences involves generating multiple versions of the same network sentence to be included in the corpus. As described in reference to FIG. 4B, the same network sentence can be rephrased, in order to present a variation of that network sentence in the corpus. Using this approach, multiple variations of the network sentences allows the NSP model to learn data dimensionality, as the dimensions between the multiple variations of the network sentences are maintained. Accordingly, by learning the dimensionality represented in each of the network sentences in the corpus (including multiple variations of the same network sentence), the NSP model can more accurately predict a missing dimension, given the related known dimensions. Even further, including variations of a network sentence may allow the NSP model to analyze only some of the dimensions relating to a network sentence, and then provide a combination of the remaining dimensions for that sentence (as deemed normal from the learned frequency of occurrence of the dimensions).

In an embodiment, operation 610 can involve a data augmentation technique. Data augmentation can reformulate the network sentences with the dimensionalities (e.g., host, user, destination server, time, data-size and transaction type)

rephrased to identify the dimensions that need to be predicted given the rest in simple natural language. Then, during prediction, the right phrasing option can be applied based on which dimensionalities are available and which need to be predicted. Given the fill words that connect the dimensionality is usually unique, the prediction step can fill the connecting words. For example, in a scenario where 3 dimensions are given, high probable $4^{th}$ dimension entries can be determined with connecting words for the $4^{th}$ dimension. Then, the dimensionalities can be fed to the model to find the possible combinations for a $5^{th}$ dimension. This may be repeated for each high probable 4th dimension entry. The same can be repeated in swapping the entities, thus limiting the predicted combinations to high probable combinations. This data augmentation approach can provide insight into questions surrounding contextuality, such as "what server can John download huge data in the morning from host build1 (5 out of 6—asking for just destination server)?" or "what does John's activity look like from build1 in the morning (asking for transaction type and destination server) ?"

Next, process 600 can proceed to operation 615 to train a NSP model, based on the crafted corpus. Conceptually network entity prediction can be described as building upon the idea of determining network entities of importance within the network, and confining the data pertaining to these accesses to make baselines meaningful. For example, popularity of a server can be used as a measure of importance. In an example, the top 'n' DNS resolutions of internal domains with enterprise keywords may be generated, and then network embedding generated from a corpus of sequences of these top 'n' servers. In the absence of such filtering, models resulting from vast amounts of network data can be unduly large and less accurate (e.g., too many false positives). However, focusing the training of a NSP model to include data that pertains to a particular user, for example, can greatly improve the efficiency in training the NSP model.

As alluded to above, training the NSP model can involve using network embeddings. Thus, operation 615 can also include generating network embeddings from network sentences in the corpus, which allows for dimensionality associated with "words" in a network sentence to be captured. In some cases, operation 615 applies word embedding techniques to the corpus for generating the network embeddings, which embeds multiple dimensions in a single model. According the embodiments, the NSP model can be trained during operation 615 on the corpus of network sentences, and related network embeddings, as described in detail in reference to FIG. 5. As a result, the NSP model be trained to learn dimensionality, or the particular dimensions correlating to certain sequences of network entities. As alluded to above, learning dimensionality drives the predictive analysis techniques of the NSP model, allowing the model to then predict a dimension given other known dimensions corresponding to a network sentence. In some embodiments, the network prediction model is implemented as a SEQ2SEQ prediction model. In other embodiments, the network prediction model can be an "attention model", as previously described. Attention models may be desirable for longer sequences to yield better results (as compared to simpler models), and in applications that are not sensitive to more compute intensive or complex training models.

Furthermore, operation 615 can involve training one or more NSP models that are particularly adapted for a particular application. For instance, a NSP model can be trained specifically for predictive modeling activity of an entire network, or a NSP model can be trained to predictively model activity for a single entity, such as an individual user. For example, a NSP model can be generated respectively for each geographic site of an enterprise network. In this example, groups can be created using behaviors in server and/or service access in the network. Alternatively, multiple NSP models may be generated for a network, where each NSP model is particularly trained for a corresponding network entity on the network. In this case, a NSP model can be trained per user, device, or internet protocol (IP) source. As such, each NSP model can predict the expected value for dimension(s) as it pertains to the respective network entity. This can be accomplished by creating a crafted corpus aligned with the particular network entity assigned to the NSP model. That is, a crafted corpus including a sequence of server grouped based on being accessed by a particular user may be used to train the NSP model use for predicting network activity for that user.

Moreover, as alluded to above, training in operation 615 can involve capturing typical network behavior, as it pertains to a particular user (or group of users), or particular server (or group of servers), over time. Thus, the NSP model can be trained using an initial set of network interactions, and retrained, using additional network interactions derived from continued monitoring of the network activity.

Subsequent to training the NSP model, the process 600 can continue to operation 620. In operation 620, the NSP model can be applied for predictive analysis with respective to network activity. As an example, the network activity of a specific user may be monitored as a network security function. By applying the NSP model during operation 620 (previously trained for that user), predictions can be made regarding expected behavior for that user, based on their currently monitored activity. In other words, a network interaction captured while monitoring the user can serve as input to the NSP model. The NSP model can analyze the received network interaction, and provide a prediction on an expected dimension, or network entity, relating to that activity. Referring back to the example of FIG. 5, operation 620 can use the NSP model to predict that an interaction (having a particular sequence of "words" in the network sentence), typically involves a particular application. Thus, the expected application that is output from the NSP model can be compared to the actual application access in the monitored network application. Accordingly, in response to predictive analysis using the disclosed NSP techniques, deviations from an expected network entity (indicative of typical network activity) and monitored network activities can be used a security feature, for example detecting anomalous behavior. For purposes of illustration, examples of NSP techniques are described in reference to a single missing dimension. However, the disclosed NSP techniques can extend its predictions from one missing dimensions to applicable combinations of two or more dimensions, from the given dimensions. It should be noted, in the case of predicting for two or more missing dimensions, that the method 600 can begin with a larger number of known dimensionality compared to lesser number of missing dimensions. In practice, it may be better to limit predictions to fewer missing dimensions, for example two unknown dimensions, to avoid dealing with exploding sets of exponential combinatorial possibilities.

In some embodiments, the disclosed predictive analysis techniques can include a visualization aspect. For example, a visualization representing network embeddings models from the corpus of network sentences can be generated in a reduced space. A network embeddings model, which is in a multidimensional space, can be translated into a visualization that is generated in a 2D or 3D space, using a NLP-driven visualization technique, such as t-SNE.

Figure 7D:
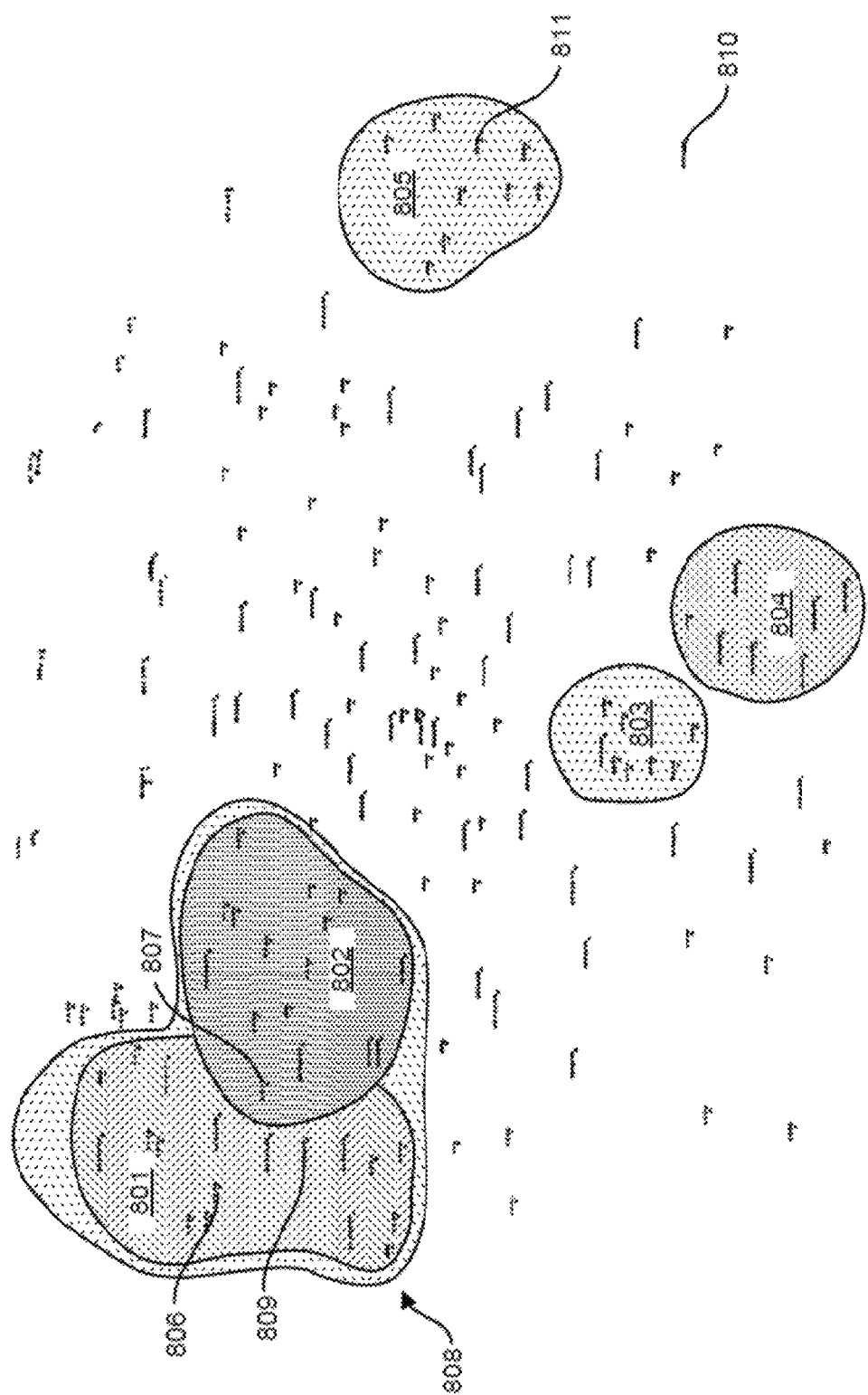
FIG. 7D depicts a semantic visualization map of a crafted corpus of network activity generated using visualization aspects of the network analytics system disclosed herein, according to some embodiments.

Now referring to FIGS. 7A-7C, examples of visualizations that can be generated as a result of the hierarchal distance techniques as described in detail in U.S. patent application Ser. No. 16/374,728, entitled "METHODS AND SYSTEMS FOR DEVICE GROUPING WITH INTERACTIVE CLUSTERING USING HIERARCHICAL DISTANCE ACROSS PROTOCOLS", incorporated herein in its entirety. In reference to FIG. 7D, examples of visualizations that can be generated as a result of the network embeddings techniques are described in detail in in U.S. patent application Ser. No. 16/513,522 filed on Jul. 16, 2019 entitled "METHODS AND SYSTEMS FOR USING EMBEDDING FROM NATURAL LANGUAGE PROCESSING (NLP) FOR ENHANCED NETWORK ANALYTICS", which is incorporated herein in its entirety.

The techniques and system disclosed herein realize multiple advantages associated with network analytics. For example, generalization of the NSP model can help regularize the behavior of a network entity. Allowing network analytics to be easily comprehensible for humans. Also, regarding machine intelligence, a generalized model reduces the cardinality based on human interpretation of dimensionality (further improving regularization). In addition, the disclosed NSP techniques can capture aspects of multiple modality with respect to a variate, or variable, associated with a network interactions. As referred to herein, multimodality can be generally described as a dataset (or variable) in which more than one mode may exist. For example, in reference to a network interaction, there may be a tendency for a user to download either early in the morning or later at night. Accordingly, a time related variable associated with that user's network activity may potentially take on more than one value (e.g., morning or night). The disclosed NSP models can captured these particular dimensions with respect to network activity, making the observed network behavior contextually-rich. In contrast, some existing approaches, utilizing distribution for example, tend to capture only any deviation from the reference, as opposed to the discrete values in the set. Accordingly, some conventional approaches may lose some the contextual value associated with dimensionality in network data. Even further, by using NLP, the disclosed systems and techniques can leverage any future advances in NLP-driven analysis (e.g., conversion of tabular data to free-flow text which maps to intuitive models) to further enhance the network analysis features described herein, as deemed appropriate.

Figure 8:
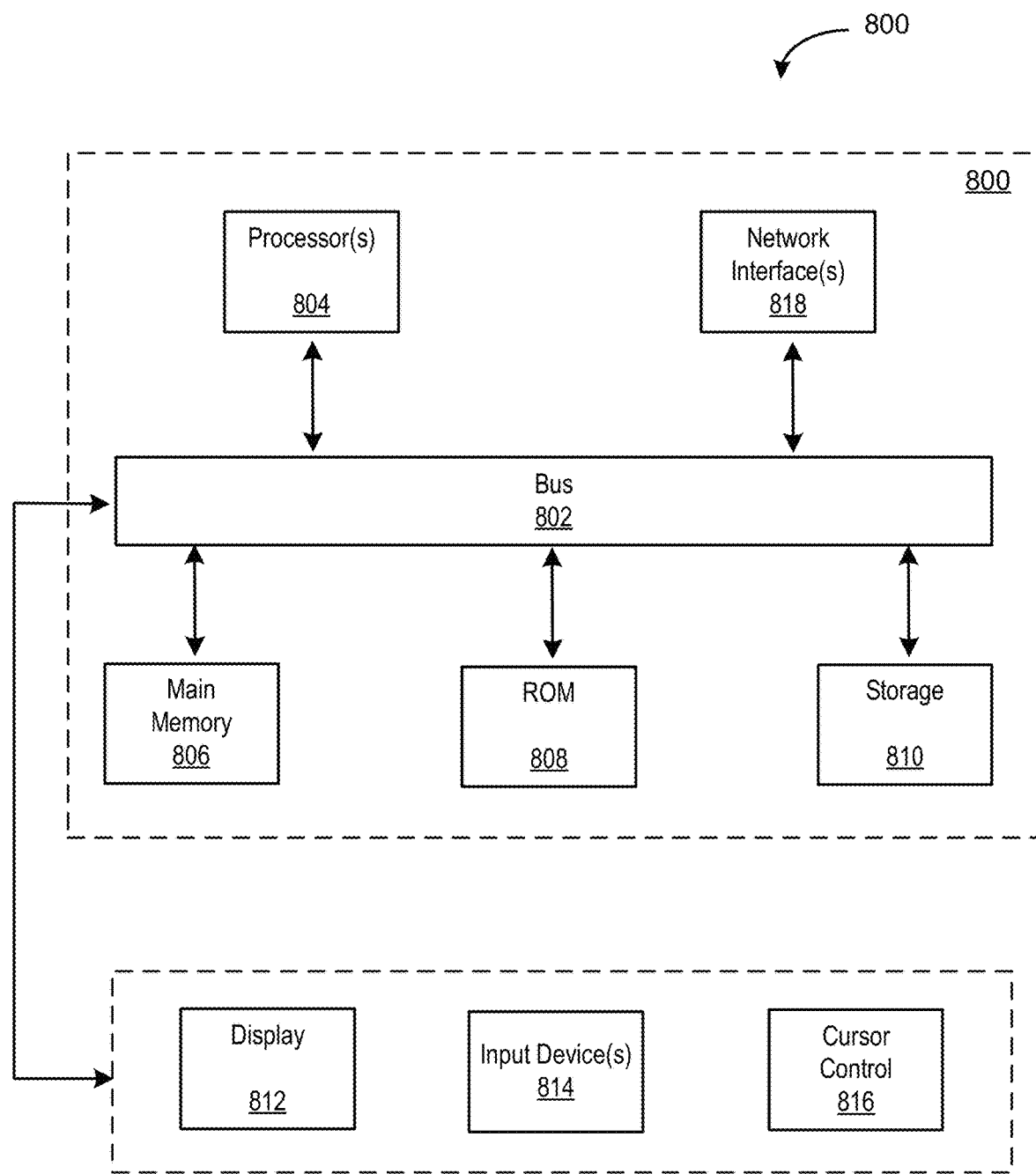
FIG. 8 illustrates an example computing device that may be used in implementing various network analytics using embeddings modeling features relating to the embodiments of the disclosed technology.

FIG. 8 depicts a block diagram of an example computer system 800 in which may be used in implementing various network analytics functions using network embeddings relating to the embodiments of the disclosed technology. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 808, such as a random-access memory (RAM), cache and/or other dynamic storage devices, coupled to bus 802 for storing information and instructions to be executed by processor 804. Main memory 808 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes storage devices 810 such as a read only memory (ROM) or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 800 in response to processor(s) 804 executing one or more sequences of one or more instructions contained in main memory 808. Such instructions may be read into main memory 808 from another storage medium, such as storage device 810. Execution of the sequences of instructions contained in main memory 808 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 508. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated service digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world-wide packet data communication network now commonly referred to as the "Internet." Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 can send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for predicting network activity within a communication network, comprising:
   receiving, by a network device, a plurality of transaction records associated with network interactions amongst a plurality of network entities in the communication network;
   analyzing, by the network device, the plurality of transaction records to identify network entities within the plurality of transaction records, wherein the network entities are identified as text strings using text-based analysis;
   generating, by the network device, a corpus including multiple network sentences, wherein each of the multiple network sentence corresponds to at least one transaction record and includes the identified network entities corresponding to the transaction record, and wherein generating the corpus comprises regularizing each of the plurality of transaction records using words to formulate the corresponding network sentence such that a sequence of words in the network sentence represents the network interaction using natural language terminology;
   training, by the network device, a network sequence prediction model using the network sentences in the corpus, wherein training the network sequence prediction model comprises for each network sentence in the corpus, identifying multiple dimensions correlating to the sequence of words in the network sentence; and
   applying, by the network device, the network sequence prediction model to monitored network interactions within the communication network in order to provide a prediction related to expected network activity for at least one identified network entity.

2. The method of claim 1, wherein training the network sequence prediction model comprises: for each network sentence, generating a embedding including a vector space of text that captures the multiple dimensions correlating to the sequence of words in the network sentence.

3. The method of claim 2, wherein training the network sequence prediction model comprises: for each network sentence in the corpus, generating multiple variations of the network sentence including the same words used in the network sentence and including a different sequence of words than the network sentence.

4. The method of claim 2, wherein training the network sequence prediction model comprises: for each of the multiple variations of the network sentence in the corpus, identifying multiple dimensions correlating to the sequence of words in the network sentence.

5. The method of claim 1, wherein applying the prediction model comprises: receiving at least one additional transaction record corresponding to a monitored network interaction; generating a monitored network sentence corresponding to the additional transaction record; identifying a monitored sequence of words corresponding to the monitored network sentence; identifying monitored dimensions correlating to the monitored sequence of words in the monitored network sentence; and analyzing the monitored dimensions in order to predict an expected dimension for the monitored sequence of words and to predict a sequence of network entities corresponding to the monitored network sentence.

6. The method of claim 5, wherein the expected dimension corresponds to an expected network entity for the monitored network interaction.

7. The method of claim 1, wherein regularizing formulates the corresponding network sentence such that a sequence of words in the network sentence represents features of the network interaction using natural language terminology.

8. The method of claim 1, wherein training the network sequence prediction model comprises: for each network sentence in the corpus, identifying multiple dimensions correlating to the sequence of words in the network sentence; and augmenting each network sentence by reformulating the network sentence to generate multiple variations of the network sentence including the same dimensions in a different sequence than the network sentence.

9. The method of claim 8, wherein applying the prediction model comprises: receiving at least one additional transaction record corresponding to a monitored network interaction; generating a monitored network sentence corresponding to the additional transaction record; identifying a monitored sequence of words corresponding to the monitored network sentence; identifying monitored dimensions correlating to the monitored sequence of words in the monitored network sentence; and analyzing the monitored dimensions and the augmented network sentences to determine a variation from the multiple variations of the network sentence based on the monitored dimensions.

10. The method of claim 9, wherein each of the augmented network sentences represent multiple modalities that correspond to each dimension.

11. The method of claim 10, wherein applying the prediction model comprises: analyzing the determined variation of the augmented network sentences to predict expected combinations of multiple modalities that correspond to the monitored dimensions.

12. A network device connected to a communications network and employed for predicting network activity within the communication network, comprising:
   a processor; and
   a storage medium comprising instructions, which when executed by the processor, causing the network device to:
      receive a plurality of transaction records associated with network interactions amongst a plurality of network entities in the communication network;
      analyze the plurality of transaction records to identify network entities within the plurality of transaction records, wherein the network entities are identified as text strings using text-based analysis;
      regularize each of the plurality of transaction records using words to formulate the corresponding network sentence such that a sequence of words in the network sentence represents the network interaction using natural language terminology;
      for each network sentence in the corpus, identify multiple dimensions correlating to the sequence of words in the network sentence;
      generate a corpus including multiple network sentences, wherein each of the multiple network sentence corresponds to at least one transaction record and includes the identified network entities corresponding to the transaction record;

train a network sequence prediction model using the network sentences in the corpus; and apply the network sequence prediction model to monitored network interactions within the communication network in order to provide a prediction related to expected network activity for at least one identified network entity.

13. The network device of claim 12, executing further instructions by the processor, causing the network device to: receive at least one additional transaction record corresponding to a monitored network interaction; generate a monitored network sentence corresponding to the additional transaction record; identify a monitored sequence of words corresponding to the monitored network sentence; identify monitored dimensions correlating to the monitored sequence of words in the monitored network sentence; and analyze the monitored dimensions in order to predict an expected dimension for the monitored sequence of words and to predict a sequence of network entities corresponding to the monitored network sentence.

14. The network device of claim 12, wherein the network device is a server connected to the communications network.

15. The network device of claim 12, wherein the network device is a client device.

16. A non-transitory machine-readable storage medium comprising instructions executable by a processor of a network device, the instructions programming the processor to:

receive a plurality of transaction records associated with network interactions amongst a plurality of network entities in the communication network;

analyze the plurality of transaction records to identify network entities within the plurality of transaction records, wherein the network entities are identified as text strings using text-based analysis;

regularize each of the plurality of transaction records using words to formulate the corresponding network sentence such that a sequence of words in the network sentence represents the network interaction using natural language terminology;

for each network sentence in the corpus, identify multiple dimensions correlating to the sequence of words in the network sentence;

generate a corpus including multiple network sentences, wherein each of the multiple network sentence corresponds to at least one transaction record and includes the identified network entities corresponding to the transaction record;

train a network sequence prediction model using the network sentences in the corpus; and apply the network sequence prediction model to monitored network interactions within the communication network in order to provide a prediction related to expected network activity for at least one identified network entity.

17. The non-transitory machine-readable storage medium of claim 16 comprising further instructions, and further programming the processor to:

apply data preparation to each of the plurality of transaction records such that data that is unusable for natural language processing (NLP) analysis is filtered from the transaction record;

regularize each of the prepared transaction records using words to formulate the corresponding network sentence such that a sequence of words in the network sentence represents the network interaction using natural language terminology; and for each network sentence in the corpus, identify multiple dimensions correlating to the sequence of words in the network sentence.

* * * * *